US010986038B1

(12) United States Patent
Montazeri et al.

(10) Patent No.: US 10,986,038 B1
(45) Date of Patent: Apr. 20, 2021

(54) AUTHORIZATIONS ASSOCIATED WITH EXTERNALLY SHARED COMMUNICATION RESOURCES

(71) Applicant: Slack Technologies, Inc., San Francisco, CA (US)

(72) Inventors: Michael Montazeri, Brooklyn, NY (US); Shanan Delp, San Francisco, CA (US); Matthew Hodgins, Toronto (CA); Elizabeth Clemenson, San Francisco, CA (US); Andrew Schmidt, San Francisco, CA (US); Lauren Bosak Wagner, San Francisco, CA (US); Joan Gamell Farre, San Francisco, CA (US); Gregg Horton, Oakland, CA (US); Yingyu Sun, San Francisco, CA (US); Anna Kalkanis, Oakland, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/681,479

(22) Filed: Nov. 12, 2019

(51) Int. Cl.
  *G06F 15/173* (2006.01)
  *H04L 12/911* (2013.01)
  *G06F 16/958* (2019.01)
  *H04L 12/927* (2013.01)

(52) U.S. Cl.
  CPC .......... *H04L 47/828* (2013.01); *G06F 16/972* (2019.01); *H04L 47/808* (2013.01)

(58) Field of Classification Search
  USPC ........................................................ 709/226
  See application file for complete search history.

(56) References Cited

U.S. PATENT DOCUMENTS

| 7,970,850 | B1 * | 6/2011 | Callanan ............... | H04L 51/046 709/207 |
| 10,402,371 | B2 | 9/2019 | Johnston et al. | |
| 10,541,825 | B2 | 1/2020 | Jin et al. | |
| 2010/0299611 | A1 * | 11/2010 | Feng ...................... | G06F 3/048 715/744 |
| 2012/0096041 | A1 * | 4/2012 | Rao ....................... | G06F 16/337 707/794 |
| 2014/0089777 | A1 * | 3/2014 | Roiniotis ................ | G06F 3/048 715/234 |

(Continued)

OTHER PUBLICATIONS

"Die, Email, Die! A Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Alan S Chou
(74) *Attorney, Agent, or Firm* — Lee & Hayes, P.C.

(57) ABSTRACT

Various embodiments of the present disclosure are directed to a group-based communication apparatus that is configured to enable end-users (e.g., non-admin users) to initiate, by way of client devices, generation of a shareable resource associated with a group-based communication resource identifier to efficiently authorize communication between client devices associated with different organization identifiers in group-based communication interfaces associated with a shared group-based communication resource identifier.

20 Claims, 23 Drawing Sheets

(56) References Cited

U.S. PATENT DOCUMENTS

| | | | | |
|---|---|---|---|---|
| 2015/0039655 | A1* | 2/2015 | Spivack | G06F 40/30 |
| | | | | 707/803 |
| 2016/0105375 | A1* | 4/2016 | Hernandez | G06F 21/445 |
| | | | | 709/226 |
| 2017/0161685 | A1 | 6/2017 | Jennings | |
| 2018/0197144 | A1* | 7/2018 | Frank | H04W 12/08 |
| 2018/0212903 | A1* | 7/2018 | Rose | G06F 16/955 |
| 2018/0287982 | A1 | 10/2018 | Draeger et al. | |
| 2019/0028287 | A1 | 1/2019 | Jin et al. | |
| 2019/0190863 | A1 | 6/2019 | Baker et al. | |
| 2019/0273627 | A1* | 9/2019 | Whalin | G06Q 30/02 |
| 2019/0361841 | A1* | 11/2019 | Johnston | G06F 16/13 |
| 2020/0014450 | A1 | 1/2020 | Park et al. | |
| 2020/0084058 | A1* | 3/2020 | Jin | H04L 12/1859 |
| 2020/0192881 | A1* | 6/2020 | Largman | G06F 16/2272 |

OTHER PUBLICATIONS

"How Slack changed the way we work by pulling the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 5 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up the Slack", TEDIUM, [online][retrieved May 9, 2019]. Retrieved from the Internet: <URL: https://tedium.co/2017/10/17/irc-vs-slack-chat-history/>. (dated Oct. 17, 2017) 8 pages.

Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 17 pages.

Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", FUJITSU Sci. Tech. J., 36, 2, (Dec. 2000) 154-161.

Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

Office Action for U.S. Appl. No. 16/681,452, dated Sep. 25, 2020, Montazeri, "Authorizations Associated With Externally Shared Communication Resources", 9 Pages.

PCT Search Report and Written Opinion dated Jan. 12, 2021 for PCT application No. PCT/US20/56518, 13 pages.

* cited by examiner

Slackbot 9:08 AM

@annie is requesting approval to join a channel shared by another organization (Luminary)

Sharing channels is a great way to work with vendors, clients, or other organizations right in Slack. Learn more Invited by
Name: Kenneth Kole (kkole@luminary.com)
Organization:  Luminary (luminary.slack.com)
This is the first channel shared between Annie's Arcade and Luminary.

Channel Details
Owner: Luminary
Name: #account-annies-arcade
Privacy: Private on both workspaces

[ Approve ] — 605
[ Decline ] — 615

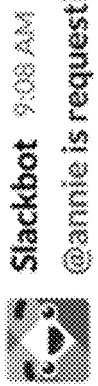

```
CREATE TABLE `shared_channel_invites_v2` (
  `id` bigint(20) unsigned NOT NULL,
  `team_id` bigint(20) unsigned NOT NULL,
  `channel_id` bigint(20) unsigned NOT NULL,
  `enterprise_id` bigint(20) unsigned NOT NULL,
  `date_create` int(10) unsigned NOT NULL,
  `date_delete` int(10) unsigned NOT NULL,
  `date_expire` int(10) unsigned NOT NULL,
  `date_revoked` int(10) unsigned NOT NULL,
  `conf_code` char(24) CHARACTER SET ascii COLLATE ascii_bin NOT NULL,
  `user_id` bigint(20) unsigned NOT NULL,
  `email` varchar(100) NOT NULL,
  `payload` mediumtext NOT NULL,
  PRIMARY KEY (`team_id`,`id`),
  KEY `team_id` (`team_id`,`channel_id`,`date_create`,`date_expire`),
  KEY `channel_id` (`date_create`,`date_expire`)
) ENGINE=InnoDB DEFAULT CHARSET=utf8mb4 ROW_FORMAT=COMPRESSED;
```

FIG. 8A

```
CREATE TABLE `shared_channel_approvals` (
  `id` bigint(20) unsigned NOT NULL,
  `team_id` bigint(20) unsigned NOT NULL,
  `channel_id` bigint(20) unsigned NOT NULL,
  `enterprise_id` bigint(20) unsigned NOT NULL,
  `approver_id` bigint(20) unsigned NOT NULL,
  `date_approve` int(10) unsigned NOT NULL,
  `date_reject` int(10) unsigned NOT NULL,
  `date_invalid` int(10) unsigned NOT NULL,
  `target_team_id` bigint(20) unsigned NOT NULL,
  `target_enterprise_id` bigint(20) unsigned NOT NULL,
  `target_accepter_id` bigint(20) unsigned NOT NULL,
  `target_approver_id` bigint(20) unsigned NOT NULL,
  `target_date_accept` int(10) unsigned NOT NULL,
  `target_date_approve` int(10) unsigned NOT NULL,
  `target_date_reject` int(10) unsigned NOT NULL,
  `payload` mediumtext NOT NULL,
  PRIMARY KEY (`team_id`,`id`,`target_team_id`),
  KEY `target_team_id` (`target_team_id`,`target_date_accept`),
  KEY `target_approver_id` (`target_date_accept`),
  KEY `channel_id` (`target_date_accept`)
) ENGINE=InnoDB DEFAULT CHARSET=utf8mb4 ROW_FORMAT=COMPRESSED;

ALTER VSCHEMA ON shared_channel_invites_v2 ADD VINDEX hash(team_id);
ALTER VSCHEMA ON shared_channel_approvals ADD VINDEX hash(team_id);
```

FIG. 8B

FIG. 9A

# AUTHORIZATIONS ASSOCIATED WITH EXTERNALLY SHARED COMMUNICATION RESOURCES

BACKGROUND

Applicant has identified a number of deficiencies and problems associated with existing methods, apparatus, and systems related to interaction with communication systems. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Various embodiments of the present disclosure are directed to a group-based communication apparatus that is configured to receive a resource sharing interface request associated with a group-based communication resource identifier from a first client device associated with a sending user identifier and to generate a shareable resource based on the resource sharing interface request. In some embodiments, the resource sharing interface request may be a channel sharing interface request comprising a group-based communication channel identifier. The group-based communication apparatus is configured to receive a confirmation indication associated with the shareable resource from one or more client devices associated with a receiving user identifier. In response to receiving the resource sharing interface request and the one or more confirmation indications, the group-based communication apparatus is configured to generate a shared resource candidate request and cause rendering of an authorization interface associated with the shared resource candidate request to at least one admin client device. In response to receiving an authorization confirmation associated with the shared resource candidate request from the at least one admin client device, the group-based communication apparatus is configured to update a group-based communication repository to at least add a sharing approval indication to table data associated with the group-based communication resource identifier.

One embodiment is directed to an apparatus comprising at least one processor and at least one non-transitory memory including program code, the at least one non-transitory memory and the program code configured to, with the processor, cause the apparatus to, in response to receiving, from a first client device associated with a sending user identifier, a resource sharing interface request, generate a shareable resource based at least in part on the resource sharing interface request, wherein the resource sharing interface request comprises a group-based communication resource identifier; in response to receiving a confirmation indication from at least one client device associated with at least one receiving user identifier, generate a shared resource candidate request; transmit to at least one admin client device an authorization interface renderable for display by the at least one admin client device, the authorization interface associated with the shared resource candidate request, and the at least one admin client device associated with a respective admin user identifier associated with the shared resource candidate request; and in response to receiving an authorization confirmation associated with the shared resource candidate request from the at least one admin client device, update a group-based communication repository to at least add a sharing approval indication to table data associated with the group-based communication resource identifier.

In some embodiments, the apparatus is further configured to cause rendering of data associated with the shareable resource to a group-based communication interface associated with the sending user identifier. In some embodiments, the apparatus is further configured to cause rendering of data associated with the shareable resource to at least one group-based communication interface associated with the at least one receiving user identifier. In some embodiments, the apparatus is further configured to receive a shareable resource access request associated with the shareable resource from one or more client devices. In an embodiment, the shareable resource comprises a uniform resource locator, and wherein the shareable resource access request is received in response to the one or more client devices accessing a hyperlink associated with the uniform resource locator.

In some embodiments of the apparatus, the confirmation indication associated with the shareable resource comprises a workspace identifier associated with the at least one receiving user identifier. In an embodiment, the confirmation indication associated with the shareable resource comprises a group-defined title associated with the at least one receiving user identifier. In some embodiments, the resource sharing interface request comprises a channel sharing interface request comprising a group-based communication channel identifier. In some embodiments, the shareable resource comprises metadata associated with one or more policies of a group-based communication channel associated with the group-based communication channel identifier. In an embodiment, the group-based communication resource identifier comprises a group-based communication workspace identifier. In an embodiment, the sharing approval indication comprises an approval timestamp associated with the authorization confirmation. In some embodiments, the apparatus is further configured to cause rendering of a graphical user interface element associated with the resource sharing interface request to a group-based communication interface at the first client device.

In accordance with another aspect, a computer-implemented method is provided. The computer-implemented method comprises, in response to receiving, from a first client device associated with a sending user identifier, a resource sharing interface request, generating a shareable resource based at least in part on the resource sharing interface request, wherein the resource sharing interface request comprises a group-based communication resource identifier; in response to receiving a confirmation indication from at least one client device associated with at least one receiving user identifier, generating a shared resource candidate request; transmitting to at least one admin client device an authorization interface renderable for display by the at least one admin client device, the authorization interface associated with the shared resource candidate request, and the at least one admin client device associated with a respective admin user identifier associated with the shared resource candidate request; and in response to receiving an authorization confirmation associated with the shared resource candidate request from the at least one admin client device, updating a group-based communication repository to at least add a sharing approval indication to table data associated with the group-based communication resource identifier.

In some embodiments, the computer-implemented method further comprises causing rendering of data associated with the shareable resource to a group-based communication interface associated with the sending user identifier. In some embodiments, the computer-implemented method further comprises causing rendering of data associated with the shareable resource to at least one group-based communication interface associated with the at least one receiving user identifier. In some embodiments, the computer-implemented method further comprises receiving a shareable resource access request associated with the shareable resource from one or more client devices. In an embodiment, the shareable resource comprises a uniform resource locator, and wherein the shareable resource access request is received in response to the one or more client devices accessing a hyperlink associated with the uniform resource locator.

In some embodiments of the computer-implemented method, the confirmation indication associated with the shareable resource comprises a workspace identifier associated with the at least one receiving user identifier. In an embodiment, the confirmation indication associated with the shareable resource comprises a group-defined title associated with the at least one receiving user identifier. In some embodiments, the resource sharing interface request comprises a channel sharing interface request comprising a group-based communication channel identifier. In some embodiments, the shareable resource comprises metadata associated with one or more policies of a group-based communication channel associated with the group-based communication channel identifier. In an embodiment, the group-based communication resource identifier comprises a group-based communication workspace identifier. In an embodiment, the sharing approval indication comprises an approval timestamp associated with the authorization confirmation. In some embodiments, the computer-implemented method further comprises causing rendering of a graphical user interface element associated with the resource sharing interface request to a group-based communication interface at the first client device.

In accordance with another aspect, a computer program product is provided. The computer program product comprises at least one non-transitory computer-readable storage medium having computer-readable program code portions stored therein. The computer-readable program code portions comprise an executable portion configured to, in response to receiving, from a first client device associated with a sending user identifier, a resource sharing interface request, generate a shareable resource based at least in part on the resource sharing interface request, wherein the resource sharing interface request comprises a group-based communication resource identifier; in response to receiving a confirmation indication from at least one client device associated with at least one receiving user identifier, generate a shared resource candidate request; transmit to at least one admin client device an authorization interface renderable for display by the at least one admin client device, the authorization interface associated with the shared resource candidate request, and the at least one admin client device associated with a respective admin user identifier associated with the shared resource candidate request; and in response to receiving an authorization confirmation associated with the shared resource candidate request from the at least one admin client device, update a group-based communication repository to at least add a sharing approval indication to table data associated with the group-based communication resource identifier.

In some embodiments, the computer-readable program code portions comprise an executable portion further configured to cause rendering of data associated with the shareable resource to a group-based communication interface associated with the sending user identifier. In some embodiments, the computer-readable program code portions comprise an executable portion further configured to cause rendering of data associated with the shareable resource to at least one group-based communication interface associated with the at least one receiving user identifier. In some embodiments, the computer-readable program code portions comprise an executable portion further configured to receive a shareable resource access request associated with the shareable resource from one or more client devices. In an embodiment, the shareable resource comprises a uniform resource locator, and wherein the shareable resource access request is received in response to the one or more client devices accessing a hyperlink associated with the uniform resource locator.

In some embodiments of the computer program product, the confirmation indication associated with the shareable resource comprises a workspace identifier associated with the at least one receiving user identifier. In an embodiment, the confirmation indication associated with the shareable resource comprises a group-defined title associated with the at least one receiving user identifier. In some embodiments, the resource sharing interface request comprises a channel sharing interface request comprising a group-based communication channel identifier. In some embodiments, the shareable resource comprises metadata associated with one or more policies of a group-based communication channel associated with the group-based communication channel identifier. In an embodiment, the group-based communication resource identifier comprises a group-based communication workspace identifier. In an embodiment, the sharing approval indication comprises an approval timestamp associated with the authorization confirmation. In some embodiments, the computer-readable program code portions comprise an executable portion further configured to cause rendering of a graphical user interface element associated with the resource sharing interface request to a group-based communication interface at the first client device.

One embodiment is directed to an apparatus comprising at least one processor and at least one non-transitory memory including program code, the at least one non-transitory memory and the program code configured to, with the processor, cause the apparatus to access table data associated with a shared group-based communication resource identifier in a group-based communication repository, wherein the table data comprises at least two user identifiers associated with different organization identifiers; transmit a treaty authorization interface to a first client device associated with a first user identifier of the at least two user identifiers; and in response to receiving, from the first client device, a first authorization confirmation associated with the treaty authorization interface, update the group-based communication repository with treaty data associated with the first authorization confirmation.

In some embodiments, the apparatus is further configured to receive, from a client device associated with a user identifier of the at least two user identifiers, a confirmation indication associated with a shareable resource comprising the two or more user identifiers and a group-based communication resource identifier; retrieve, from the group-based communication repository, treaty data associated with the two or more user identifiers; and based on the treaty data, update the group-based communication repository to at least add a sharing approval indication to table data associated with the group-based communication resource identifier. In some embodiments, the apparatus is further configured to cause rendering of a treaty authorization interface to at least one client device associated with a user identifier of the two or more user identifiers; and receive, from the at least one client device, an authorization confirmation associated with the treaty authorization interface.

In some embodiments of the apparatus, the group-based communication repository is updated with treaty data in response to receiving an authorization confirmation from each client device associated with each of the two or more user identifiers. In some embodiments, the apparatus is further configured to determine that the group-based communication repository comprises treaty data associated with the two or more user identifiers. In some embodiments of the apparatus, the table data is accessed in response to a request to store a sharing approval indication associated with the two or more user identifiers. In an embodiment of the apparatus, the table data is accessed based on a predefined threshold of sharing approval indications associated with the two or more user identifiers.

In accordance with another aspect, a computer-implemented method is provided. The computer-implemented method comprises accessing table data associated with a shared group-based communication resource identifier in a group-based communication repository, wherein the table data comprises at least two user identifiers associated with different organization identifiers; transmitting a treaty authorization interface to a first client device associated with a first user identifier of the at least two user identifiers; and in response to receiving, from the first client device, a first authorization confirmation associated with the treaty authorization interface, updating the group-based communication repository with treaty data associated with the first authorization confirmation.

In some embodiments, the computer-implemented method further comprises receiving, from a client device associated with a user identifier of the at least two user identifiers, a confirmation indication associated with a shareable resource comprising the two or more user identifiers and a group-based communication resource identifier; retrieving, from the group-based communication repository, treaty data associated with the two or more user identifiers; and based on the treaty data, updating the group-based communication repository to at least add a sharing approval indication to table data associated with the group-based communication resource identifier. In some embodiments, the computer-implemented method further comprises causing rendering of a treaty authorization interface to at least one client device associated with a user identifier of the two or more user identifiers; and receiving, from the at least one client device, an authorization confirmation associated with the treaty authorization interface.

In some embodiments of the computer-implemented method, the group-based communication repository is updated with treaty data in response to receiving an authorization confirmation from each client device associated with each of the two or more user identifiers. In some embodiments, the computer-implemented method further comprises determining that the group-based communication repository comprises treaty data associated with the two or more user identifiers. In some embodiments of the computer-implemented method, the table data is accessed in response to a request to store a sharing approval indication associated with the two or more user identifiers. In an embodiment of the computer-implemented method, the table data is accessed based on a predefined threshold of sharing approval indications associated with the two or more user identifiers.

In accordance with another aspect, a computer program product is provided. The computer program product comprises at least one non-transitory computer-readable storage medium having computer-readable program code portions stored therein. The computer-readable program code portions comprise an executable portion configured to access table data associated with a shared group-based communication resource identifier in a group-based communication repository, wherein the table data comprises at least two user identifiers associated with different organization identifiers; transmit a treaty authorization interface to a first client device associated with a first user identifier of the at least two user identifiers; and in response to receiving, from the first client device, a first authorization confirmation associated with the treaty authorization interface, update the group-based communication repository with treaty data associated with the first authorization confirmation.

In some embodiments, the computer-readable program code portions comprise an executable portion further configured to receive, from a client device associated with a user identifier of the at least two user identifiers, a confirmation indication associated with a shareable resource comprising the two or more user identifiers and a group-based communication resource identifier; retrieve, from the group-based communication repository, treaty data associated with the two or more user identifiers; and based on the treaty data, update the group-based communication repository to at least add a sharing approval indication to table data associated with the group-based communication resource identifier. In some embodiments, the computer-readable program code portions comprise an executable portion further configured to cause rendering of a treaty authorization interface to at least one client device associated with a user identifier of the two or more user identifiers; and receive, from the at least one client device, an authorization confirmation associated with the treaty authorization interface.

In some embodiments of the computer program product, the group-based communication repository is updated with treaty data in response to receiving an authorization confirmation from each client device associated with each of the two or more user identifiers. In some embodiments, the computer-readable program code portions comprise an executable portion further configured to determine that the group-based communication repository comprises treaty data associated with the two or more user identifiers. In some embodiments of the computer program product, the table data is accessed in response to a request to store a sharing approval indication associated with the two or more user identifiers. In an embodiment of the computer program product, the table data is accessed based on a predefined threshold of sharing approval indications associated with the two or more user identifiers.

BRIEF DESCRIPTION OF THE SEVERAL VIEWS OF THE DRAWINGS

Reference will now be made to the accompanying drawings, which are not necessarily drawn to scale, and wherein:

FIG. 6A shows an example rendering of an authorization interface associated with the shared channel candidate request to an admin client device configured in accordance with one embodiment;

FIG. 6B shows an example rendering of an authorization interface associated with the shared channel candidate request to an admin client device configured in accordance with one embodiment;

FIG. 8A is an example model of table data stored in a group-based communication repository in accordance with one embodiment;

FIG. 8B is an example model of table data stored in a group-based communication repository in accordance with one embodiment;

FIG. 9A shows an example rendering of an authorization interface associated with the shared channel candidate request to an admin client device configured in accordance with one embodiment;

DETAILED DESCRIPTION

Figure 1:
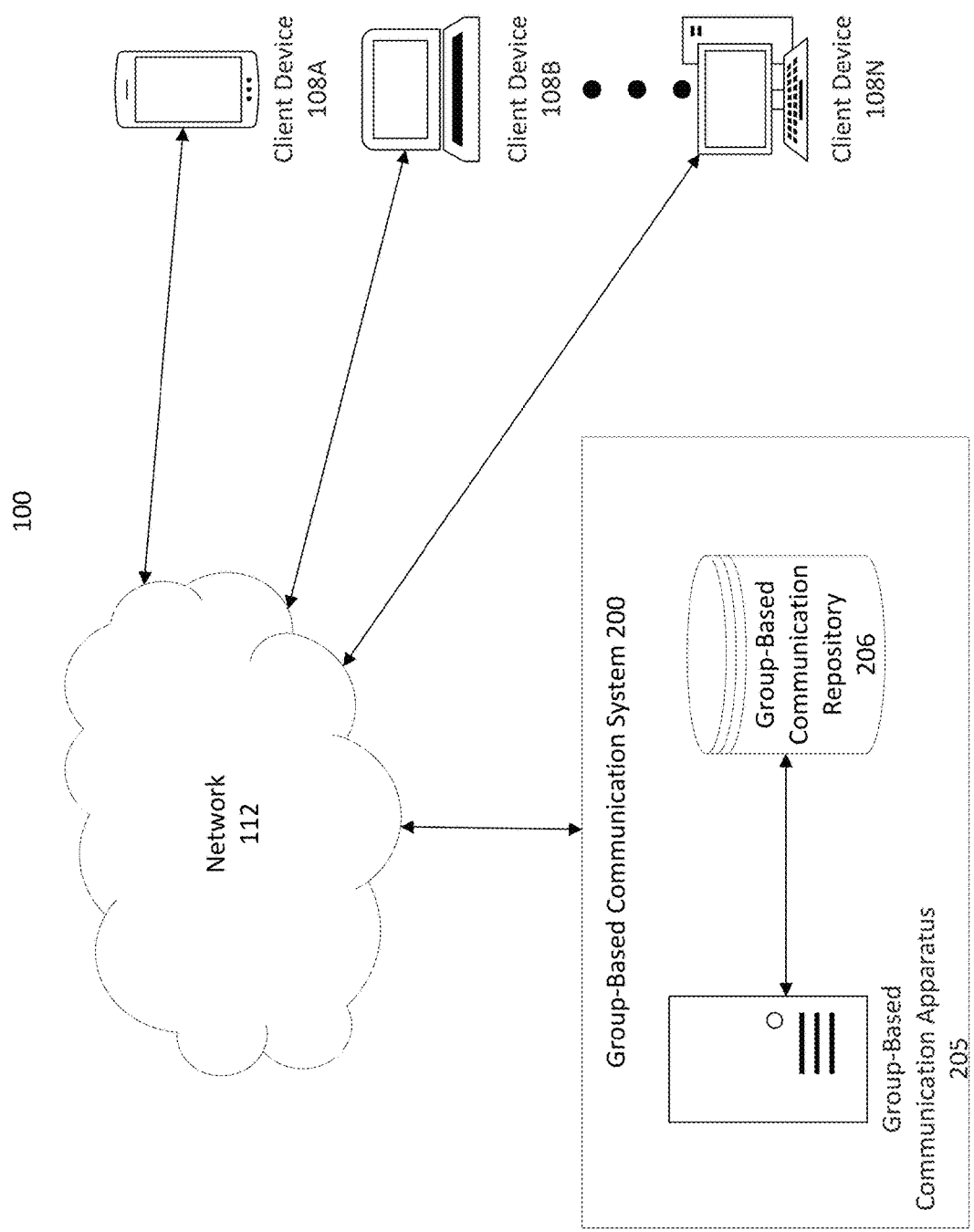
FIG. 1 shows a schematic view of a group-based communication system in communication with client devices according to various embodiments of the present disclosure.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

In a group-based communication system, users may communicate with one another in a myriad of ways. For example, a user may be a member of one or more group-based communication workspaces, each group-based communication workspace dedicated to a particular organizational group or team having a defined member list (i.e., a defined list of authenticated user profiles). In this regard, members of a group-based communication workspace may each be associated with a particular group identifier and/or a particular organization identifier.

Each group-based communication workspace may include a plurality of group-based communication channels. Upon accessing a group-based communication interface to interact with an associated group-based communication channel, a user (by way of a client device) may generate and transmit one or more messaging communications to a group-based communication server to be rendered within the group-based communication interface. The user may also view, respond to, and/or otherwise interact with one or more messaging communications transmitted by other members of the particular group-based communication channel to the group-based communication server and rendered within a group-based communication interface associated with the group-based communication channel.

In certain instances, it may be desirable for users of a particular organization within a group-based communication channel to communicate with one or more users outside of their organization within the group-based communication channel. As an example, users associated with a particular company or commercial enterprise may be members of a group-based communication channel titled "legal-matters" and may find it beneficial to communicate with one or more legal representatives outside of the company (i.e., associated with a different organization identifier) in the "legal-matters" channel. In this regard, the members may be associated with an organization identifier for their company, whereas the legal representatives may be associated with an organization identifier for a law firm. As another example, users associated with a particular organization may be members of a group-based communication channel titled "supplier-communication" and may find it beneficial to communicate with one or more vendors and/or suppliers outside of the company that provide goods and services to the organization in the "supplier-communication" channel. In this regard, the members may be associated with an organization identifier for their organization, whereas the one or more suppliers may each be associated with an organization identifier for their respective company. Further examples of externally shared channels are provided in, for example, U.S. application Ser. No. 15/655,634, filed Jul. 20, 2017 and entitled METHOD, APPARATUS AND COMPUTER PROGRAM PRODUCT FOR GENERATING EXTERNALLY SHARED COMMUNICATION CHANNELS, U.S. application Ser. No. 15/816,925, filed Nov. 17, 2017 and entitled METHOD, APPARATUS AND COMPUTER PROGRAM PRODUCT FOR GENERATING EXTERNALLY SHARED COMMUNICATION CHANNELS, U.S. application Ser. No. 16/576,086, filed Sep. 19, 2019 and entitled METHOD, APPARATUS AND COMPUTER PROGRAM PRODUCT FOR GENERATING EXTERNALLY SHARED COMMUNICATION CHANNELS, U.S. application Ser. No. 16/206,578, filed Nov. 30, 2018 and entitled METHOD, APPARATUS AND COMPUTER PROGRAM PRODUCT FOR GENERATING EXTERNALLY SHARED COMMUNICATION CHANNELS, and U.S. application Ser. No. 16/438,957, filed Jun. 12, 2019 and entitled METHOD, APPARATUS AND COMPUTER PROGRAM PRODUCT FOR GENERATING EXTERNALLY SHARED COMMUNICATION CHANNELS, each of which is incorporated by reference herein in its entirety.

Alternatively, or in addition to sharing a group-based communication channel with external users, users of a particular organization may desire to externally share one or more other resources associated with the group-based communication system. For example, users may desire to externally share not just a particular group-based communication channel, but an entire group-based communication workspace with one or more users outside of their organization. As another example, users may desire to externally share one or more group-based communication resources such as one or more direct messages, multi-person direct messages, and/or the like.

However, members of a group-based communication system may experience difficulty in initiating setup of a group-based communication channel or other resource in which the members can communicate and/or share data with one or more members outside of their particular organization. For instance, when attempting to externally share a group-based communication channel, a member of the group-based communication channel may need to first contact an admin user of the group-based communication channel before inviting a user outside of the member's organization to the group-based communication channel. Additionally, after contacting the admin user, the member may need to rely on the admin user to follow through with the initiation of a shared group-based communication channel. In this regard, the admin user may need to define one or more properties, policies, or settings of the shared group-based communication channel, as well as provide an invitation or notification to the user outside of the organization. This process may be burdensome on an admin user, as a request to set up a shared group-based communication channel may arrive without context. Additionally, it may not be clear to a member requesting the shared group-based communication channel what the appropriate policies and processes should be for a particular organization, which may lead to a denial by an admin user, causing delay and frustration. An unresponsive or delay-prone admin user may lead to user confusion and continuous data transmissions in the form of requests that go unanswered, unnecessarily increasing the load on the network. This may lead to negative relations between organizations, especially in instances in which time is of the essence in communicating or sharing group-based communication resources with users outside of the organization.

Various embodiments of the present disclosure are directed to an improved group-based communication apparatus that is configured to enable end-users (e.g., non-admin users) to initiate generation of a shareable resource to efficiently authorize communication and/or group-based communication resource sharing between members of different organizations in a group-based communication system.

Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user" should be understood to refer to an individual, group of individuals, business, organization, and the like. The users referred to herein are enabled to access a group-based communication system using client devices. Each user of the group-based communication system is associated with at least one "group identifier." Each group identifier may be one or more items of data by which a group may be uniquely identified. For example, in one embodiment, a group identifier may be stored as a 64-bit unsigned integer and represented externally (outside of memory) as a base-34 encoded string. In other embodiments, the group identifier may comprise a combination of ASCII characters.

"Group-based" is used herein to refer to a system, channel, communication, message, or virtual environment that has security sufficient such that it is accessible only to a defined group of users. The group may be defined by common access credentials such as those of an organization or commercial enterprise. Access may further be facilitated by a validated request to join or an invitation to join transmitted by one group member user to another non-member user. Group or team identifiers (defined below) are used to associate data, information, messages, users, group-based communication channels, etc., with specific groups of a group-based communication system as defined below.

The term "group-based communication system" refers to a communications software platform and associated hardware that is configured to support and maintain a plurality of group-based communication workspaces and all associated functionality. Group-based communication system users are organized into organization groups (e.g., employees of different companies may be separate organization groups) and each group interacts with the system via a respective group-based communication workspace. For example, the group-based communication system might support, among others, a Slack Corporation group-based communication workspace and an ACME Corporation group-based communication workspace. Example group-based communication systems comprise supporting servers, client devices, and third-party resources.

The terms "user profile" refer to information of a group-based communication system that is associated with a user, including, for example, a user identifier, a role identifier, one or more group-based communication channel identifiers associated with group-based communication channels that the user has been granted access to, one or more group identifiers for groups with which the user is associated, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user profile details can include a subset designation of user credentials, such as, for example, login information for the user including the user's username and password.

As used herein, the term "user identifier" refers to one or more items of data by which a user and this user's corresponding user profile may be identified within a group-based communication system. For example, a user identifier may comprise ASCII text, a pointer, a memory address, or other unique identifier.

A "role identifier" refers to one or more items of data by which a role of a user may be identified and is associated with a user profile. A role of a user may refer to the status of the user within the group-based communication channel, the company associated with the user or group, or other type of role. For example, a channel comprising users associated with a particular commercial organization may comprise roles such as "employee," "associate," "client," "supervisor," and the like. For example, a role identifier may comprise ASCII text, a pointer, a memory address, or other unique identifier.

The term "team identifier" refers to one or more items of data by which a group or workspace within a group-based communication system may be identified. For example, a team identifier may comprise ASCII text, a pointer, a memory address, and the like. Team identifiers are used to distinguish group-based communication channels, messages, files, members, etc., associated with one group-based communication workspace from another group-based communication workspace.

The term "organization identifier" refers to one or more items of data by which an organization within a group-based communication system may be uniquely identified. In embodiments, an organization can comprise an enterprise or corporation. For example, an organization identifier may comprise ASCII text, a pointer, a memory address, and the like.

The term "group-based communication apparatus" or "group-based communication server" refers to a software platform and associated hardware (e.g., server, etc.) that is configured to manage access to the various group-based communication workspaces (defined below) of the group-based communication system. The group-based communication apparatus is configured to access, maintain, and support application product logic of the group-based communication system and to access one or more data repositories such as a group-based communication repository.

The term "group-based communication workspace" refers to a virtual communications environment configured to facilitate user interaction with a group-based communication system. Each group-based communication workspace is accessible and viewable (as a group-based communication interface defined below) to a select group of users, such as a group of employees of a business or organization (e.g., the Slack Corp. interface would be accessible and viewable to the Slack employees however the ACME Corporation group-based communication workspace would not be accessible and viewable to Slack employees). The group-based communication workspace includes a plurality of group-based communication channels (e.g., a marketing channel, sales channel, accounting channel, etc.), which are defined herein. In various embodiments, user profiles sharing a common group identifier (defined below) form part of a common group-based communication workspace.

The term "group-based communication interface" is a graphical user interface of a group-based communication system that is configured to allow users to (e.g., group members) to view and engage a group-based communication workspace. A group-based communication interface is rendered to a client device based on data and instructions provided by the group-based communication system. In some embodiments, such data and instructions are facilitated by a dedicated software application running on the client device. In other embodiments, such data and instructions are provided through a web browser running on the client device. Each group-based communication interface is visually configured to define a sidebar pane and a message pane. A "sidebar pane" is configured to display lists of group-based communication channels and/or shared group-based communication channels and is typically organized by group-defined titles (defined below). A "message pane" is configured to display one or more messages of a group-based communication channel upon user selection of a group-based communication channel from the sidebar pane.

The term "group-based communication channel" refers to a virtual communications environment or feed that is configured to display messaging communications posted by channel members (e.g., validated users accessing the environment using client devices) that are viewable only to the members of the channel. The format of the group-based communication channel may appear differently to different members of the group-based communication channel; however, the content of the group-based communication channel (i.e., messaging communications) will be displayed to each member of the group-based communication channel. For instance, a common set of group-based messaging communications will be displayed to each member of the respective group-based communication channel such that the content of the group-based communication channel (i.e., messaging communications) will not vary per member of the group-based communication channel. Group-based communication channels are typically organized in list form within the sidebar of the group-based communication interface based on group-defined titles. A "group-defined title" is a channel name or text string that is conceived and stored at the time a group-based communication channel is created for common identification to all members of the group-based communication channel. In many embodiments, group-defined titles are created based on a group-wide nomenclature/procedure so that group members may readily understand the purpose of any associated group-based communication channel. Example group-defined titles include: #accounting—audit 2019, #accounting—payroll, #HR—onboarding procedure, #food truck frenzy, and the like. A shared group-based communication channel may have a unique group-defined title for each user identifier and/or group identifier associated with the shared group-based communication channel.

The term "shared group-based communication channel" refers to a group-based communication channel having members affiliated with different organizations or commercial enterprises. In this regard, a shared group-based communication channel is accessible and viewable by users associated with different organization identifiers. A shared group-based communication channel may be generated in an instance in which a group-based communication apparatus updates a group-based communication repository to at least add a sharing approval indication to table data associated with the group-based communication channel identifier.

The terms "group-based communication channel identifier" or "channel identifier" refer to one or more items of data by which a group-based communication channel or shared group-based communication channel may be identified. For example, a group-based communication channel identifier may comprise ASCII text, a pointer, a memory address, and the like.

The term "messaging communication" refers to any electronically generated digital content object provided by a user using a client device and that is configured for display within a group-based communication channel. In some examples, a messaging communication may be automatically generated by a group-based communication server. Message communications may include any text, image, video, audio or combination thereof provided by a user (using a client device). For instance, the user may provide a messaging communication that includes text as well as an image and a video within the messaging communication as message contents. In such a case, the text, image, and video would comprise the messaging communication. Each messaging communication sent or posted to a group-based communication channel of the group-based communication system includes message metadata comprising the following: a sending user identifier, a message identifier, a group identifier, and a group-based communication channel identifier. In some embodiments, message metadata also comprises a timestamp that identifies the time that a messaging communication was transmitted (i.e., sent) or posted to a group-based communication channel. Each of the foregoing identifiers may comprise ASCII text, a pointer, a memory address, and the like. In addition to message metadata, messaging communications also include body content data that comprises text, an image, a file, video, or the like.

A "sending user identifier" is associated with a collection of messaging communications or requests that are sent by a particular user (e.g., sent by a client device associated with the particular user, user identifier, or user profile). These messaging communications may be analyzed or parsed to determine context regarding the user (e.g., the user's expertise or interest in a topic may be determined based on the frequency of mention of the topic or key words associated with the topic within such messages). A sending user identifier may comprise ASCII text, a pointer, a memory address, and the like.

Group-based communication system users may join group-based communication channels. Some group-based communication channels may be globally accessible to those users having a particular organizational group identifier associated with their user profile (i.e., users who are members of the organization). Access to some group-based communication channels may be restricted to members of specified groups, whereby the group-based communication channels are accessible to those users having a particular group identifier associated with their user profile. The group-based communication channel identifier may be used to facilitate access control for a messaging communication (e.g., access to the messaging communication may be restricted to those users having the group-based communication channel identifier associated with their user profile, or who have the ability to join the group-based communication channel). The group-based communication channel identifier may be used to determine context for the messaging communication (e.g., a description of the group-based communication channel, such as a description of a project discussed in the group-based communication channel, may be associated with the group-based communication channel identifier).

The term "message metadata" refers to data that describes messaging communications and is used to index, render, query, or organize messaging communications within a group-based communication system. Each messaging communication sent or posted to a group-based communication channel of the group-based communication system includes message metadata comprising the following: a sending user identifier, a message identifier, a group identifier, and a group-based communication channel identifier. In some embodiments, the message metadata comprises a timestamp that identifies the time of the messaging communication. As graphical objects are added or appended to a selected message communication (e.g., as emojis or reaction), the group-based communication system is configured to add graphical object identifiers associated with such added graphical objects to the message metadata associated with the selected messaging communication.

The term "channel sharing interface request" refers to a demand or instruction created by a client device upon user engagement with an interface element associated with creating a shared group-based communication channel. The channel sharing interface request includes a sending user identifier associated with the user who initiated the channel sharing interface request and a group-based communication channel identifier associated with a group-based communication channel to be shared. The channel sharing interface request is configured to trigger the group-based communication apparatus to generate a shareable resource based on the channel sharing interface request.

The term "resource sharing interface request" refers to a demand or instruction created by a client device upon user engagement with an interface element associated with creating an externally shared group-based communication resource. The resource sharing interface request includes a sending user identifier associated with the user who initiated the resource sharing interface request and a group-based communication channel identifier associated with a group-based communication channel to be shared. The resource sharing interface request is configured to trigger the group-based communication apparatus to generate a shareable resource based on the resource sharing interface request.

The term "group-based communication resource" refers to any element provided by the group-based communication system that users may utilize and/or share for group-based communication. Examples of group-based communication resources include group-based communication workspaces, group-based communication channels, direct messages, multi-person direct messages, files, group-based communication data objects, and/or the like. The term "shared resource" refers to a group-based communication resource having members and/or associated with user identifiers affiliated with different organization identifiers. In this regard, a shared group-based communication resource is accessible and viewable by users having client devices associated with different group identifiers, organization identifiers, and the like. A shared group-based communication resource may be generated in an instance in which a group-based communication apparatus updates a group-based communication repository to at least add a sharing approval indication to table data associated with the group-based communication resource identifier.

The term "group-based communication resource identifier" refers to one or more items of data by which a particular resource within a group-based communication system may be identified. For example, a group identifier may comprise ASCII text, a pointer, a memory address, and the like. Examples of group-based communication resource identifiers include group-based communication channel identifiers, group-based communication workspace or team identifiers, and/or the like.

The term "shareable resource" refers to a data structure that is shareable with one or more users and includes details regarding a resource sharing interface request. The shareable resource is generated by the group-based communication apparatus in response to receiving a resource sharing interface request. The group-based communication apparatus can provide the shareable resource to the sending user and/or one or more receiving users associated with the channel sharing interface request. The shareable resource includes a sending user identifier, a group-based communication resource identifier, data associated with one or more policies governing the group-based communication resource (e.g., group-based communication channel) associated with the group-based communication resource identifier, and a uniform resource locator of a web page associated with the group-based communication system.

The term "shareable resource access request" refers to a demand or instruction that is generated by a client device that has received a shareable resource in response to the client device accessing a web page associated with a uniform resource locator of the shareable resource. The shareable resource access request is transmitted to and received by the group-based communication apparatus. The shareable resource access request is received in response to a client device associated accessing a hyperlink associated with the uniform resource locator.

The term "shared channel candidate request" refers to a demand or instruction that is generated by the group-based communication apparatus in response to receiving a confirmation indication from a client device associated with a target user identifier of a shareable resource. The shared channel candidate request includes data similar to data includes in a shareable resource, including a group-based communication channel identifier, a sending user identifier, one or more receiving user identifiers, and data associated with one or more policies governing the group-based communication channel associated with the group-based communication channel identifier. Data associated with the shared channel candidate request may be rendered to an admin client device associated with an admin user associated with the group-based channel identifier of the shared channel candidate request The term "shared resource candidate request" refers to a demand or instruction that is generated by the group-based communication apparatus in response to receiving a confirmation indication from a client device associated with a target user identifier of a shareable resource. The shared channel candidate request includes data similar to data includes in a shareable resource, including an identifier associated with a particular group-based communication resource, a sending user identifier, one or more receiving user identifiers, and data associated with one or more policies governing the group-based communication resource associated with the particular resource identifier. Data associated with the shared resource candidate request may be rendered to an admin client device associated with an admin user associated with the organization identifier of the shared resource candidate request. In some embodiments, a shared resource candidate request may comprise a shared channel candidate request.

The term "authorization interface" refers to a modal, window, menu, pane, or other graphical user interface element that is configured to enable admin user selection of an action to be taken associated with a shared resource candidate request. In various embodiments discussed herein, the group-based communication apparatus is configured to render data associated with a shared resource candidate request to an authorization interface.

The term "admin user" refers to a subscriber of a group-based communication channel or workspace who has authority to manage the group-based communication channel or workspace and associated resources and make decisions on behalf of other subscribers regarding various maintenance tasks. For example, an admin user may have the authority to set a communication channel as either "public" or "private." As another example, when receiving a request to create an externally shared communication channel or other resource, only an admin user has the authority to accept the request on behalf of the group.

The term "admin client device" refers to computer hardware and/or software that is configured to access a service made available by a server. The server is often (but not always) on another computer system, in which case the admin client device accesses the service by way of a network. Admin client devices may include, without limitation, smart phones, tablet computers, laptop computers, wearables, personal computers, enterprise computers, and the like. The admin client device is a client device associated with an admin user. An admin client device is associated with an admin user identifier.

The term "treaty data" refers to data associated with two or more organization identifiers. Treaty data is generated by the group-based communication apparatus in response to receiving authorization confirmation associated with a treaty authorization interface from one or more admin client devices. Treaty data can be stored in a group-based communication repository by the group-based communication apparatus and can be used to signal that a resource sharing interface request does not require generation of a shared resource candidate request for admin approval to create a shared channel and/or other resource between users associated with the two or more organization identifiers. In this regard, the determination of presence of treaty data in a group-based communication repository by a group-based communication apparatus can signal the group-based communication apparatus to update the group-based communication repository to at least add a sharing approval indication to table data associated with a group-based communication resource identifier of a resource sharing interface request.

The term "group-based communication repository" refers to the location, such as a memory device, where data, such as data associated with one or more group-based communication channels and other group-based communication resources is stored. The group-based communication repository may be a dedicated device and/or a part of a larger repository. The group-based communication repository may be dynamically updated or be static. For example, table data may be uploaded to the group-based communication repository simultaneously with the generation of a shared resource interface request and/or generation of a confirmation indication associated with the shared resource interface request. Alternatively, data may not be uploaded simultaneously upon generation and instead may be batch uploaded based on other factors, such as based on time intervals (e.g., uploads occur every 15 minutes), user initiation (e.g., user may press a button to initiate the upload), or the like. The group-based communication repository may be encrypted in order to limit unauthorized access of data and associated engagement data.

The term "sharing approval indication" refers to an indicator, such as a flag, stored in a group-based communication repository by a group-based communication apparatus and associated with a group-based communication channel identifier or another identifier of a particular shared resource. The sharing approval indication is stored by the group-based communication apparatus in response to receiving one or more authorization confirmations from one or more admin client devices. The presence of a sharing approval indication in a group-based communication repository indicates that the channel associated with the group-based communication channel identifier and/or resource associated with the particular resource identifier is shared between two or more organizations (e.g., organization identifiers). The term "approval timestamp" refers to data representing a date on which the shared resource candidate request was approved by one or more admin users. In some embodiments, the sharing approval indication comprises an approval timestamp.

The term "treaty authorization interface" refers to a modal, window, menu, pane, or other graphical user interface element that is configured to enable user selection of an action to be taken associated with treaty data associated with two or more organization identifiers. In various embodiments discussed herein, the group-based communication apparatus is configured to render treaty data to an authorization interface.

The term "confirmation indication" refers to a demand or instruction that is generated by a client device and transmitted to the group-based communication apparatus in response to the client device receiving a shareable resource and the user associated with the client device subsequently approving the request. The confirmation indication may comprise data associated with a shareable resource, such as the sending user identifier, group-based communication channel identifier, a receiving user identifier associated with a user who initiated the generation of the confirmation indication, and, in some embodiments, data associated with a workspace to associate with the group-based communication channel identifier.

The term "authorization confirmation" refers to a demand or instruction that is generated by an admin client device and transmitted to the group-based communication apparatus in response to the admin client device receiving a shared resource candidate request and the admin user associated with the admin client device subsequently approving the request.

The term "table data" refers to data associated with a group-based communication channel identifier or other resource identifier stored in tabular form in a group-based communication repository. The table data may be caused to be stored by a group-based communication apparatus, one or more client devices, and/or one or more admin client devices. Table data comprises data associated with the group-based communication channel identifier and may include one or more user identifiers, one or more admin user identifiers, a sharing approval indication, one or more organization identifiers, one or more timestamps, and/or data associated with one or more policies associated with the group-based communication channel identifier. Table data may be retrieved from a group-based communication repository by a group-based communication apparatus, client device, and/or admin client device.

The term "threshold" refers to a value that must be met or exceeded for a particular event to occur. The threshold may be predefined by a group-based communication apparatus, client device, and/or admin client device and stored in a group-based communication repository.

The term "policies" refers to one or more rules, permissions, security agreements, and/or the like associated with a group-based communication channel identifier. Policies may be determined by an organization (e.g., organization identifier) and/or users (e.g., admin or non-admin users) that created the group-based communication channel. Data associated with policies may indicate which members of a group-based communication channel are permitted to perform certain actions, such as post messaging communications to the group-based communication channel, share files, invite new members, and/or the like.

System Overview

Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally, or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example computing system 100 within which embodiments of the present disclosure may operate. Users may access a group-based communication system 200 via a communications network 112 using client devices 108A-108N. In an embodiment, the client devices 108A-108N may comprise one or more admin client devices. The group-based communication system 200 may comprise a group-based communication apparatus 205 in communication with at least one group-based communication repository 206.

Communications network 112 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communications network 112 may include a cellular telephone, an 802.11, 802.16, 802.20, and/or WiMax network. Further, the communications network 112 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In some embodiments, the protocol is a custom protocol of JSON (JavaScript Object Notation) objects sent via a Websocket channel. In some embodiments, the protocol is JSON over RPC ("remote procedural call), JSON over REST ("Representational State Transfer")/HTTP ("HyperText Transfer Protocol"), and the like.

The group-based communication apparatus 205 may be embodied as a computer or computers. The group-based communication apparatus 205 may provide for receiving of electronic data from various sources, including but not necessarily limited to the client devices 108A-108N. For example, the group-based communication apparatus 205 may be operable to receive and transmit group-based messaging communications provided by the client devices 108A-108N.

The group-based communication repository 206 may be embodied as a data storage device such as a Network Attached Storage (NAS) device or devices, or as a separate database server or servers. The group-based communication repository 206 includes information accessed and stored by the group-based communication apparatus 205 to facilitate the operations of the group-based communication system 200. For example, the group-based communication repository 206 may include, without limitation, a plurality of messaging communications organized among a plurality of group-based communication channels, various data associated with one or more users, group-based communication channels and/or workspaces, and/or the like.

The client devices 108A-108N may be any computing device as defined above. Electronic data received by the group-based communication apparatus 205 from the client devices 108A-108N may be provided in various forms and via various methods. For example, the client devices and/or admin client devices 108A-108N may include desktop computers, laptop computers, smartphones, netbooks, tablet computers, wearables, and the like.

In embodiments where a client device 108A-108N is a mobile device, such as a smartphone or tablet, the client device 108A-108N may execute an "app" to interact with the group-based communication system 200. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system.

Additionally, or alternatively, the client device 108A-108N may interact with the group-based communication system 200 via a web browser. As yet another example, the client devices 108A-108N may include various hardware or firmware designed to interface with the group-based communication system 200.

In some embodiments of an exemplary group-based communication system 200, a messaging communication may be sent from a client device 108A-108N to a group-based communication system 200. In various implementations, the messaging communication may be sent to the group-based communication system 200 over communications network 112 directly by a client device 108A-108N, the messaging communication may be sent to the group-based communication system 200 via an intermediary such as a message server, and/or the like. For example, the client device 108A-108N may be a desktop, a laptop, a tablet, a smartphone, and/or the like that is executing a client application (e.g., a group-based communication app). In one implementation, the messaging communication may include data such as a message identifier, sending user identifier, a group identifier, a group-based communication channel identifier, body content data (e.g., text, emojis, images, links), attachments (e.g., files), message hierarchy data (e.g., the messaging communication may be a reply to another message), third party metadata, and/or the like.

In one embodiment, the client device 108A-108N may provide the following example messaging communication, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.coln
Content-Type: Application/XML
Content-Length: 667
<?XML version ="1.0" encoding ="UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookielD</cookie>
            //OPTIONAL    <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
```

```
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>nickname.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-
XXXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-_
XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <message>
        <message_identifier>ID_message_10</message_identifier>
        <team_identifier>ID_team_1</team_identifier>
        <channel_identifier>ID_channel_1</channel_identifier>
        <body contents>That is an interesting invention. I have attached a copy our patent
policy.</body contents>
        <attachments>patent_policy.pdf</attachments>
    </message>
</auth_request>
```

The group-based communication system 200 comprises at least one group-based communication apparatus 205 that may create a storage message based upon the received messaging communication to facilitate message indexing and storage in a group-based communication repository 206. In one implementation, the storage message may include data such as a message identifier, a group identifier, a group-based communication channel identifier, a sending user identifier, topics, responses, message contents (i.e., body content data), attachments, message hierarchy data, third party metadata, conversation primitive data, and/or the like. For example, the group-based communication apparatus 205 may provide the following example storage message, substantially in the form of a HTTP(S) POST message including XML-formatted data, as provided below:

```
POST /storage_message.php HTTP/1.1
Host: www. server. com
Content-Type: Application/XML
Content-Length: 667
    <?XML version = "1.0" encoding = "UTF-8"?>
    <storage_message>
    <message_identifier>ID_message_10</message_identifier>
    <team_identifier>ID_team_1</team_identifier>
    <channel_identifier>ID_channel_1</channel_identifier>
    <sending_user_identifier>ID_user_1</sending_user_identifier>
    <topics>
        <topic>disclosures</topic>
        <topic>patents</topic>
        <topic>policies</topic>
    </topics>
    <responses>
        <response>liked by ID_user 2</response>
        <response>starred by ID_user 3</response>
    </responses>
    <body contents>That is an interesting disclosure. I have attached a copy our patent
policy.</body contents>
    <attachments>patent_policy.pdf</attachments>
    <conversation_primitive>
        conversation includes messages: ID_message_8, ID_message_9, ID_message_10,
        ID_message 11, ID_message_12
    </conversation_primitive>
</storage_message>
```

In embodiments, a sending user identifier may be associated with the messaging communication. In one implementation, message metadata associated with the messaging communication may be parsed (e.g., using PHP—i.e., the script language derived from Personal Home Page Tools— commands) to determine a sending user identifier of the user who sent the message.

In embodiments, messaging communications may be parsed (e.g., using PHP commands) to determine topics discussed in the messaging communication. For example, hashtags in the message may indicate topics associated with the message. In another example, special characters (e.g., "@") may indicate a text object associated with a user identifier. In another example, the messaging communication may be analyzed (e.g., by itself, with other messaging communications in a conversation primitive) or parsed using a machine learning technique, such as topic modeling, to determine topics associated with the messaging communication.

In embodiments, data indicating responses may be associated with the messaging communication. For example, responses to the messaging communication by other users may include reactions (e.g., selection of a graphical object such as an emoji associated with the messaging communication, selection of a "like" button associated with the message), clicking on a hyperlink embedded in the messaging communication, replying to the messaging communication (e.g., posting a messaging communication to the group-based communication channel in response to the messaging communication), downloading a file associated with the messaging communication, sharing the messaging communication from one group-based communication channel to another group-based communication channel, pinning the messaging communication, starring the messaging communication, and/or the like. In one implementation, data regarding responses to the messaging communication by other users may be included with the messaging communication, and the messaging communication may be parsed (e.g., using PHP commands) to determine the responses. In another implementation, data regarding responses to the messaging communication may be retrieved from a database. For example, data regarding responses to the messaging communication may be retrieved via a MySQL database command similar to the following:
    SELECT messageResponses
    FROM MSM_Message
    WHERE messageID=ID_message_10.

For example, data regarding responses to the messaging communication may be used to determine context for the messaging communication (e.g., a social score for the messaging communication from the perspective of some user). In another example, data regarding responses to the messaging communication may be analyzed to determine context regarding the user (e.g., the user's expertise in a topic may be determined based on the responses to the user's messaging communication regarding the topic).

In embodiments, attachments may be included with the messaging communication. If there are attachments, files may be associated with the messaging communication. In one implementation, the messaging communication may be parsed (e.g., using PHP commands) to determine file names of the attachments. For example, file contents may be analyzed to determine context for the messaging communication (e.g., a patent policy document may indicate that the messaging communication is associated with the topic "patents").

In embodiments, message metadata may be associated with the messaging communication. For example, message metadata may provide additional context regarding the messaging communication or the user that is specific to a company, group, a group-based communication workspace, a group-based communication channel, and/or the like. In one implementation, the messaging communication may be parsed (e.g., using PHP commands) to determine message metadata. For example, message metadata may indicate whether the user who sent the messaging communication is an authorized representative of the group-based communication channel (e.g., an authorized representative may be authorized by the company to respond to questions in the group-based communication channel).

In embodiments, a conversation primitive may be associated with the messaging communication. In one implementation, a conversation primitive is an element used to analyze, store, and/or the like messaging communications.

For example, the messaging communication may be analyzed by itself, and may form its own conversation primitive. In another example, the messaging communication may be analyzed along with other messaging communications that make up a conversation, and the messaging communications that make up the conversation may form a conversation primitive. In one implementation, the conversation primitive may be determined as the messaging communication, a specified number (e.g., two) of preceding messaging communications and a specified number (e.g., two) of following messaging communications. In another implementation, the conversation primitive may be determined based on analysis of topics discussed in the messaging communication and other messaging communications (e.g., in the group-based communication channel) and/or proximity (e.g., messaging communication send order proximity, messaging communication send time proximity) of these messages.

Example Apparatus for Implementing Embodiments of the Present Disclosure

Figure 2:
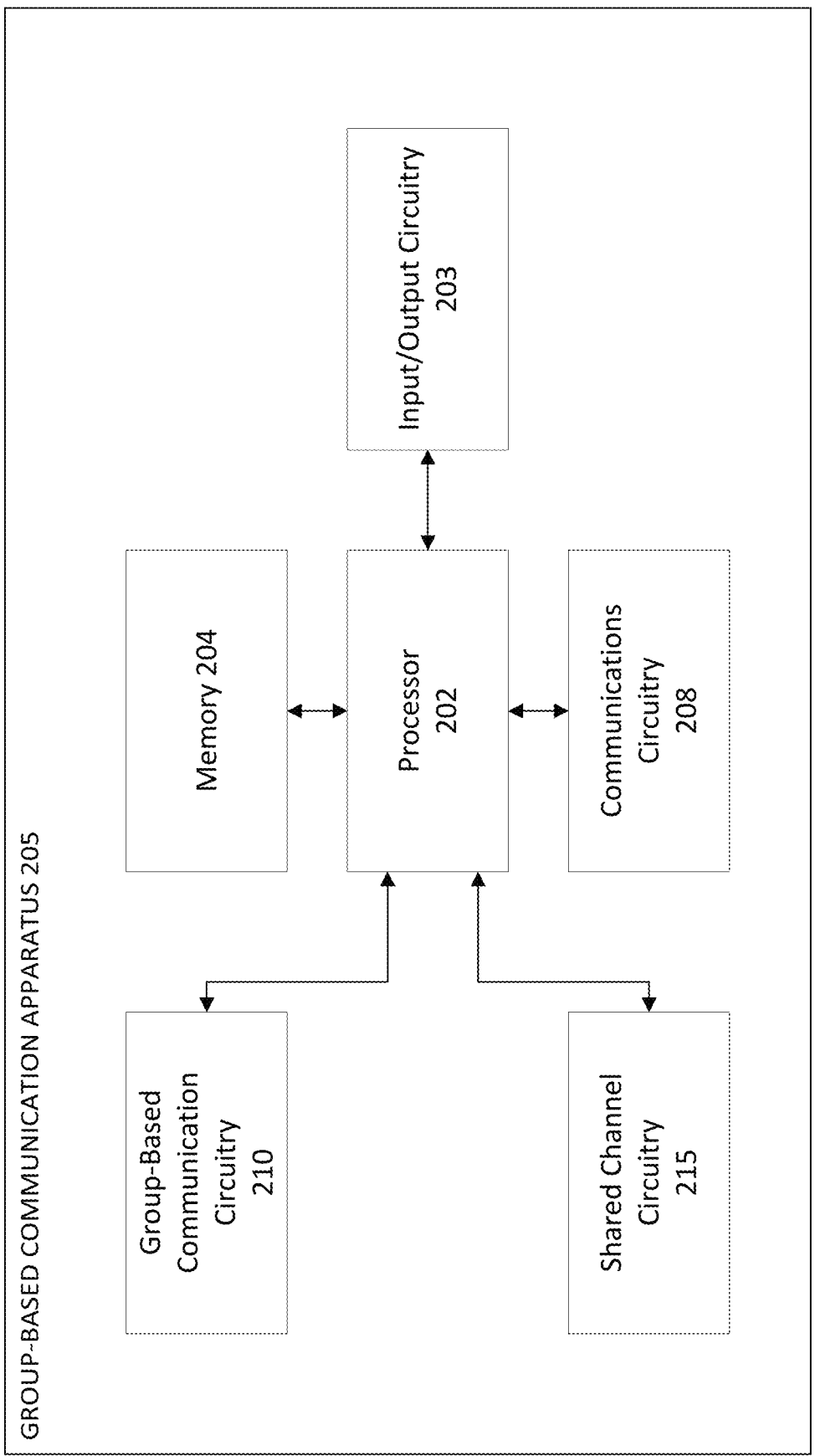
FIG. 2 shows a schematic view of a group-based communication apparatus according to one embodiment.

The group-based communication apparatus 205 may be embodied by one or more computing systems, such as group-based communication apparatus 205 shown in FIG. 2. The group-based communication apparatus 205 may include a processor 202, a memory 204, input/output circuitry 203, communications circuitry 208, group-based communication circuitry 210, and shared channel circuitry 215. The apparatus 205 may be configured, using one or more of the circuitry 203, 208, 210, and 215, to execute the operations described herein.

Although the components are described with respect to functional limitations, it should be understood that the particular implementations necessarily include the use of particular hardware. It should also be understood that certain of the components described herein may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 205 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the group-based communication apparatus 205 to carry out various functions in accordance with example embodiments of the present disclosure.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively, or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As just one example, the processor 202 may be configured to maintain one or more communication channels connecting a plurality of client devices 108A-108N (shown in FIG. 1) to enable messaging communication sharing therebetween. The processor 202 ensures that messaging communications intended for exchange between the client devices 108A-108N within the particular communication channel are properly disseminated to those client devices 108A-108N for display within respective message panes provided via the client devices 108A-108N.

Moreover, the processor 202 may be configured to synchronize messaging communications exchanged on a particular communication channel with a database for storage of messages therein. In certain embodiments, the processor 202 may provide stored messages for dissemination to client devices 108A-108N. The processor 202 may also provide to distribute such stored messages across various group-based communication workspaces and associated group-based communication channels as discussed herein.

In some embodiments, the group-based communication apparatus 205 may include input/output circuitry 203 that may, in turn, be in communication with processor 202 to provide output to the user and, in some embodiments, to receive an indication of a user input. The input/output circuitry 203 may comprise a user interface (e.g., a group-based communication interface) and may include a display and may comprise a web user interface, a mobile application, a client device, a kiosk, or the like. In some embodiments, the input/output circuitry 203 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the group-based communication apparatus 205. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s).

The group-based communication circuitry 210 includes hardware and software configured to support a group-based communication system 200. The group-based communication circuitry 210 may utilize processing circuitry, such as the processor 202, to perform these actions. The group-based communication circuitry 210 may send and/or receive data from group-based communication repository 206. In some implementations, the sent and/or received data may be group-based communication objects (e.g., messages, files, links, etc.) organized among a plurality of group-based communication channels. It should also be appreciated that, in some embodiments, the group-based communication circuitry 210 may include a separate processor, specially configured field programmable gate array (FPGA), or application specific interface circuit (ASIC).

The shared channel circuitry 215 includes hardware and software configured to support shared group-based communication channel related functionality, features, and/or services of the group-based communication system 200. The shared channel circuitry 215 may utilize processing circuitry, such as the processor 202, to perform these actions. The graphical object suggestion circuitry 215 may send and/or receive data from group-based communication repository 206. In some implementations, the sent and/or received data may be data that is configured for association with one or more group-based communication channels and/or users. It should also be appreciated that, in some embodiments, the shared channel circuitry 215 may include a separate processor, specially configured field programmable gate array (FPGA), or application specific interface circuit (ASIC).

It is also noted that all or some of the information discussed herein can be based on data that is received, generated and/or maintained by one or more components of the group-based communication apparatus 205. In some embodiments, one or more external systems (such as a remote cloud computing and/or data storage system, one or more external resources 110A-110N) may also be leveraged to provide at least some of the functionality discussed herein.

As described above and as will be appreciated based on this disclosure, embodiments of the present disclosure may be configured as methods, mobile devices, frontend graphical user interfaces, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

Example Processes for Practicing Embodiments of the Present Disclosure

Figure 3A:
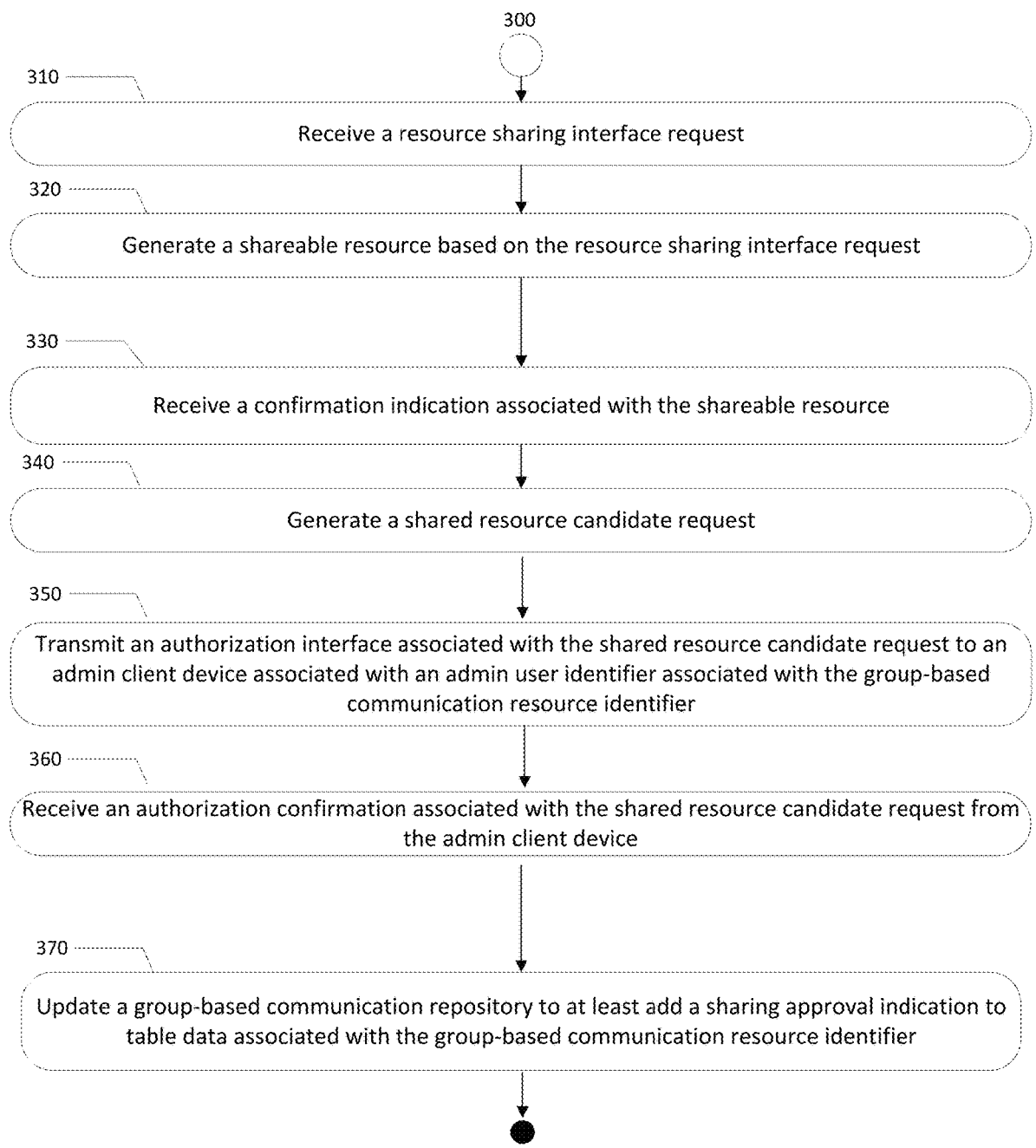
FIG. 3A is a flowchart illustrating steps for authorizing generation of a shared group-based communication channel configured in accordance with one embodiment.

In embodiments, the group-based communication apparatus 205 is configured to authorize generation of a shared group-based communication channel and/or other group-based communication resource and update data associated with the shared group-based communication channel and/or other group-based communication resource in a group-based communication repository in accordance with the process blocks of the method 300 of FIG. 3A.

The depicted process begins at Block 310 wherein the group-based communication apparatus 205 receives a resource sharing interface request. The group-based communication apparatus 205 may receive, from a client device 108A associated with a non-admin user associated with a first organization identifier (e.g., a sending user), the resource sharing interface request via communications circuitry 208 and/or network 112. In one embodiment, the resource sharing interface request is received upon the user interacting with one or more user interface elements of a group-based communication interface, such as the example group-based communication interface illustrated in FIG. 4A.

Figure 4A:
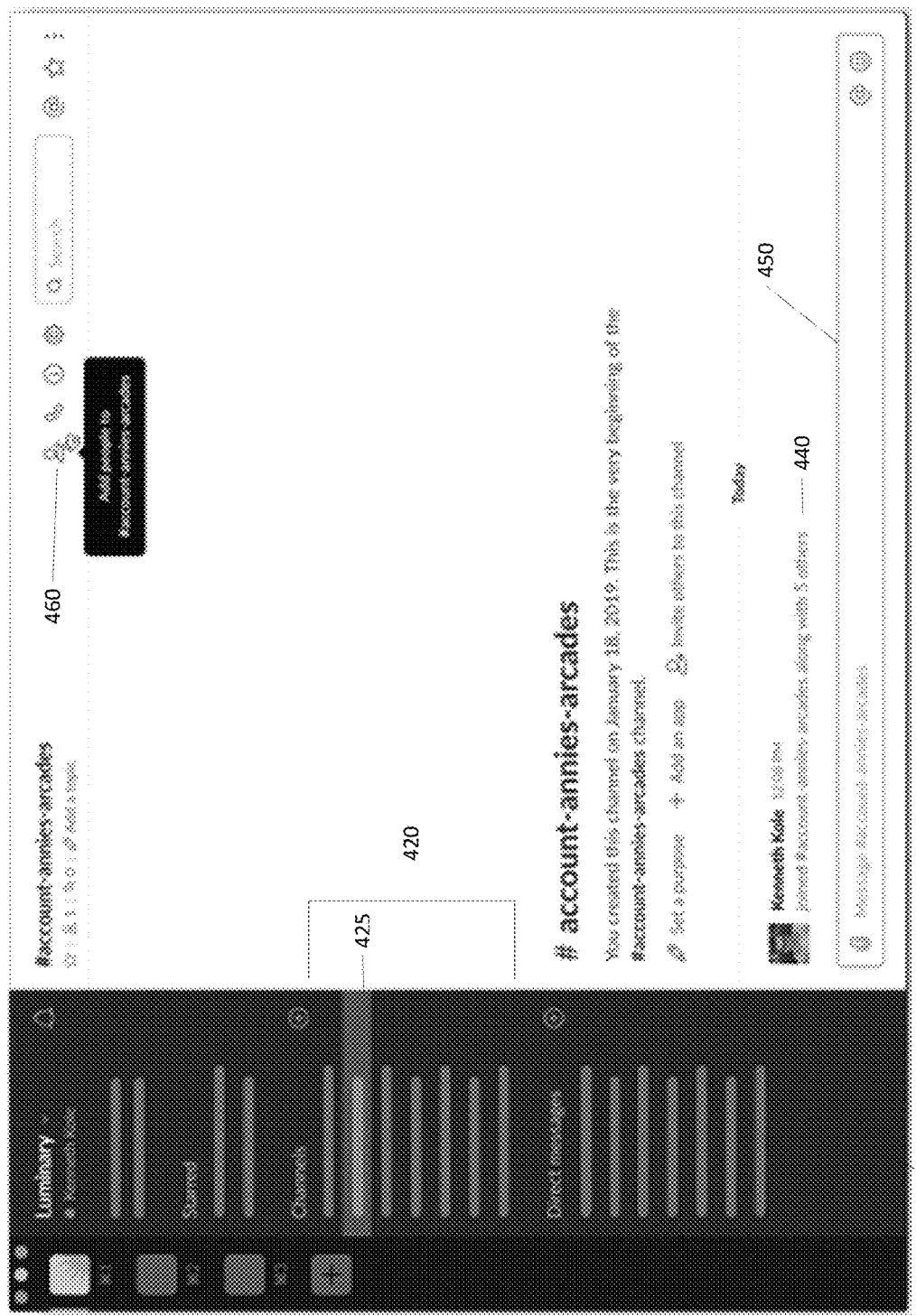
FIG. 4A shows an example group-based communication interface associated with generating a resource sharing interface request configured in accordance with one embodiment.

FIG. 4A depicts an example group-based communication interface 400 structured in accordance with various embodiments of the disclosure. The depicted group-based communication interface 400 comprises a sidebar pane 410 and a message pane 430. The sidebar pane 410 includes a permitted group-based communication channel set 420 arranged vertically as shown. The depicted permitted group-based communication channel set 420 may be arranged (e.g., alphabetically) in the sidebar pane 410 based on respective group-defined titles. The depicted permitted group-based communication channel set 420 includes those private group-based communication channels and public group-based communication channels to which the user accessing the depicted group-based communication interface 400 has been granted access by the group-based communication system.

Each group-defined title of the permitted group-based communication channel set 420 represents a user-engageable link configured for accessing group-based communication objects (e.g., messaging communications, files, etc.) associated with respective group-based communication channels. Once a user clicks on, engages, touches, or otherwise selects a group-defined title link, messaging communications or other data associated with the selected group-based communication channel are rendered to the message pane 430. In the depicted embodiment, a group-defined title link 425 is selected and messages associated with the selected group-based communication channel "#account-annies-arcades" are rendered to the message pane 430. Other group-based communication objects (e.g., files, images, apps, etc.) are accessible through the message pane 430 or links embedded within the message pane 430.

The message pane 430 may comprise at least one messaging communication 440. In the depicted embodiment, messaging communication 440 is an example messaging communication that has been transmitted to the group-based communication server and rendered within a group-based communication interface associated with the group-based communication channel by a user, "Kenneth Kole," for other users associated with the group-based communication channel to view and/or interact with.

The group-based communication interface 400 may also include a messaging communication input element 450. A user may input data (e.g., text, emojis, links, hashtags, etc.) into the messaging communication input element 450 for transmission to the group-based communication server for rendering within the group-based communication interface associated with the group-based communication channel by providing user engagement to the messaging communication input element 450. Once a messaging communication is transmitted to the group-based communication server, it is rendered to message pane 430 of the group-based communication interface 400.

The group-based communication interface 400 may further comprise one or more graphical user interface elements 460. In the depicted embodiment, the graphical user interface request element 460 is associated with adding and/or inviting one or more users to the "#account-annies-arcades" channel. Although illustrated as a standalone button, it is to be appreciated that the graphical user request element 460 may be embodied in other forms, such as a selectable option within a drop-down menu 470 illustrated in FIG. 4D, a selectable hyperlink within a messaging communication, and/or the like. In this regard, user selection (e.g. touch, mouse-click, etc.) of the graphical user interface request element 460 causes the group-based communication apparatus 205 to render a graphical user interface element in the form of a dialog box, such as a dialog box shown in FIG. 4B, to the interface 400. Although illustrated as a dialog box, it is to be appreciated that the graphical user interface element may take the form of any user interface element for displaying data, such as a modal, window, menu, pane, and/or the like. Additionally, although the following paragraphs highlight an embodiment associated with externally sharing a group-based communication channel (e.g., a channel sharing interface request), it will be appreciated that the following may apply to externally sharing any group-based communication resource, such as a group-based communication workspace, direct message, multi-person direct message, and/or the like. In this regard, the graphical user request element 460 may be associated with inviting one or more users to externally share a group-based communication resource different than a group-based communication channel.

Figure 4B:
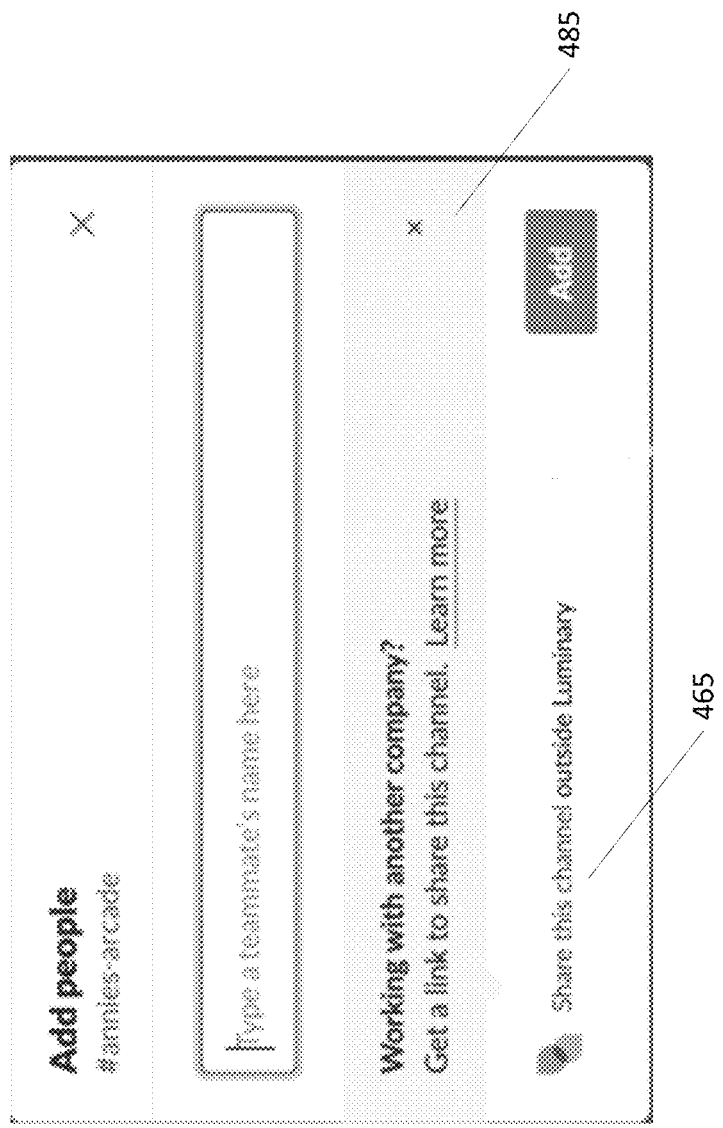
FIG. 4B shows an example graphical user interface element associated with generating a resource sharing interface request configured in accordance with one embodiment.
Figure 4C:
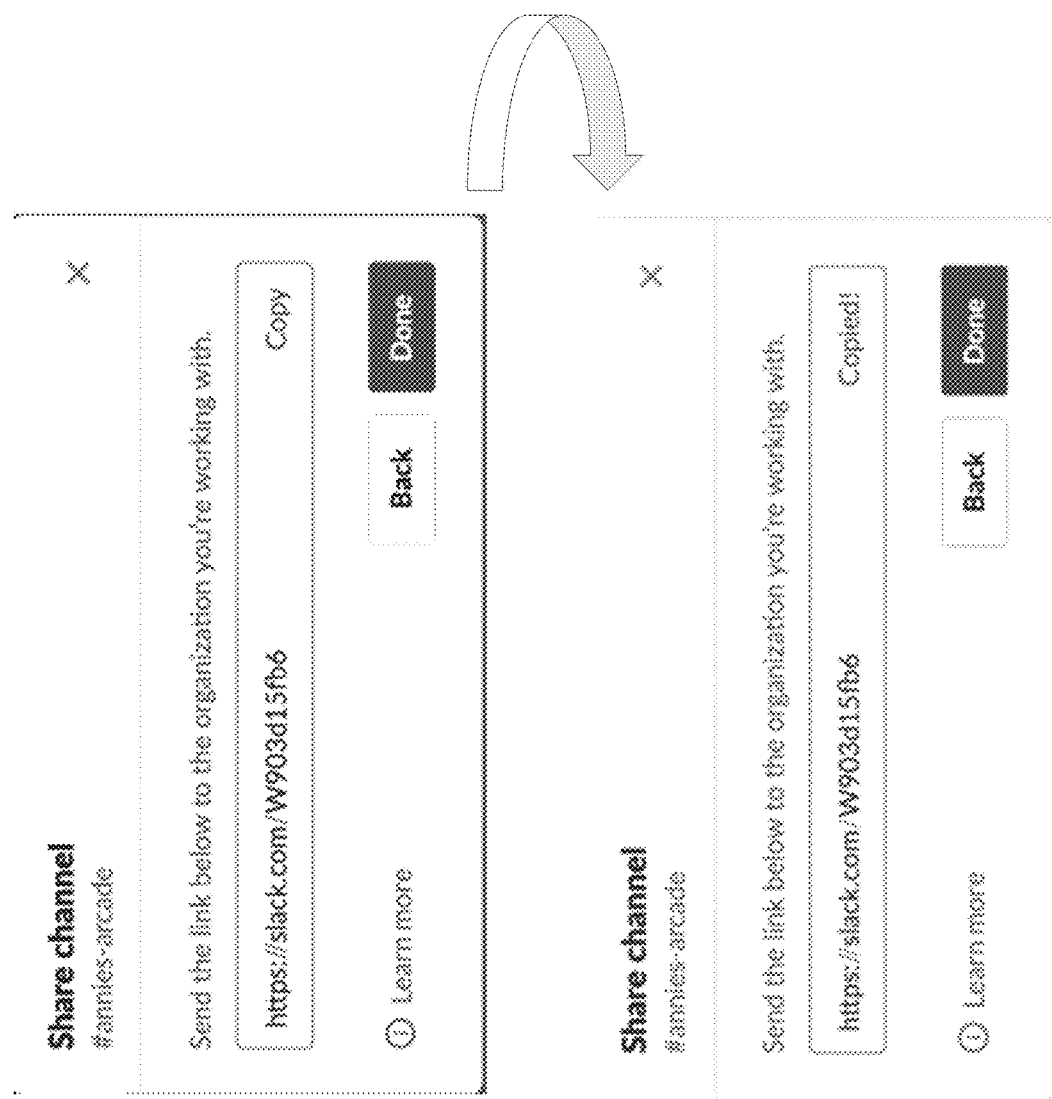
FIG. 4C shows an example graphical user interface element associated with a shareable resource configured in accordance with one embodiment.
Figure 4D:
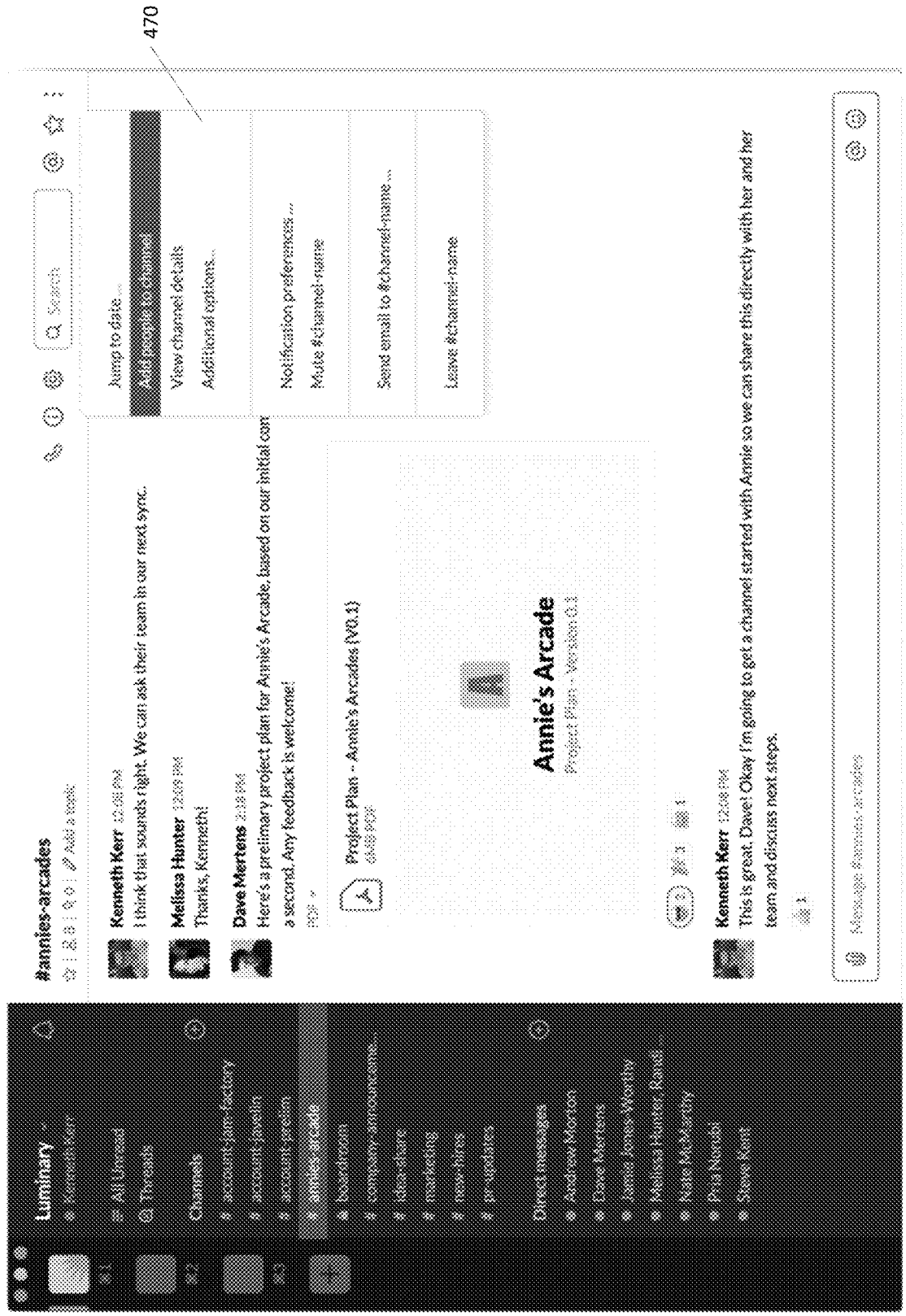
FIG. 4D shows an example group-based communication interface associated with generating a resource sharing interface request configured in accordance with one embodiment.

Additionally, while the illustrated embodiments of FIG. 4A-C describe various dialog boxes and a channel sharing interface request associated with a pre-existing group-based communication channel, it will be appreciated that the channel sharing interface request may be transmitted in association with creation of a new group-based communication channel.

FIG. 4B illustrates an exemplary graphical user interface element (shown as a dialog box) that may be rendered to a group-based communication interface of a user (e.g., a sending user) at a client device by the group based-communication apparatus 205 in response to said user selecting the graphical user interface request element 460. The dialog box may display various options for adding and/or inviting one or more users to a group-based communication channel. In the illustrated embodiment of FIG. 4B, the user may input one or more names of users to be added to the group-based communication channel. The dialog box may further include an option to share a particular resource, such as the group-based communication channel, with users outside of the organization associated with the organization identifier of the sending user. In the illustrated embodiment of FIG. 4B, this option is presented as a graphical user interface element in the form of a hyperlink 465. In some embodiments, the dialog box may further comprise a tooltip 485, and/or the like for indicating that the particular resource is shareable with users outside of the organization. Once the user has provided selection (e.g. touch, mouse-click, etc.) of the hyperlink 465, the client device associated with the sending user identifier may generate a resource sharing interface request and transmit the resource sharing interface request to the group-based communication apparatus 205 (e.g., via the network 112 and/or communications circuitry 210). In some embodiments in which the resource sharing interface request comprises a channel sharing interface request, the dialog box may further include additional data, such as a listing of current members of the group-based communication channel, data associated with one or more policies of the group-based communication channel, and/or the like.

The resource sharing interface request may comprise metadata. For example, the resource sharing interface request may comprise metadata including the user identifier of the user (i.e., a sending user identifier) who initiated the resource sharing interface request, and a group-based communication resource identifier associated with the particular group-based communication resource that the user intends to share. For example, in an instance in which the resource sharing interface request comprises a channel sharing interface request, the associated resource identifier may be a group-based communication channel identifier. As another example, if the resource sharing interface request is associated with externally sharing a group-based communication workspace, the associated resource identifier may be a group-based communication workspace identifier. In this regard, the group-based communication apparatus 205 is configured to receive, from a client device associated with a sending user identifier and via communications circuitry, a resource sharing interface request.

In some embodiments in which the resource sharing interface request is a channel sharing interface request, table data in a group-based communication repository may be updated by the group-based communication apparatus in response to the group-based communication apparatus 205 receiving the channel sharing interface request. For example, as illustrated in FIG. 8A, the group-based communication apparatus may create a row in a table 'shared_channel_invites_v2' and may update one or more fields of the row based on the shareable resource. For example, the 'channel_id' field may be updated to comprise the group-based communication channel identifier of the channel sharing interface request. As another example, the 'date_create' field may be updated with the date on which the channel sharing interface request was received. In some embodiments, the group-based communication apparatus 205 may generate a confirmation code (e.g., a randomized series of numbers, letters, symbols, and/or the like) and store the confirmation code in association with the 'conf_code' field. In some embodiments, the group-based communication apparatus may access and retrieve the table data (e.g., the row of table data) from the group-based communication repository.

Figure 4E:
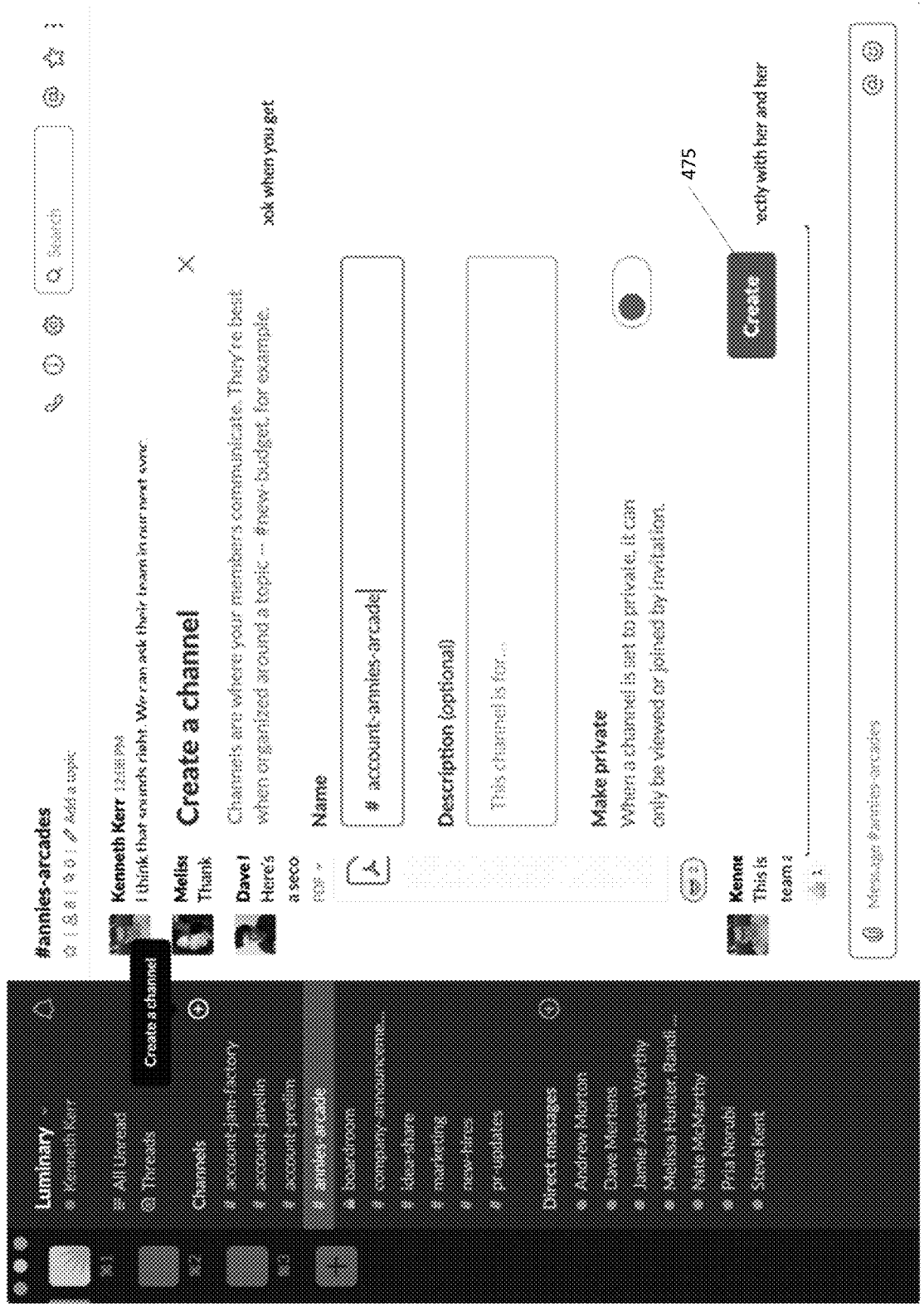
FIG. 4E shows an example group-based communication interface associated with generating a resource sharing interface request configured in accordance with one embodiment.

As described above, in some embodiments, the channel sharing interface request may be transmitted in association with creation of a new group-based communication channel. As illustrated in FIG. 4E, after assigning a group-defined title to the new group-based communication channel and selecting the create button 475, the group-based communication apparatus 205 may cause rendering of a dialog box or the like for sharing the group-based communication channel with external users (e.g., the dialog box of FIG. 4B).

At Block 320, in response to receiving the resource sharing interface request, the group-based communication apparatus 205 may generate a shareable resource based at least in part on the resource sharing interface request. In this regard, the group-based communication apparatus 205 is configured to, via shared channel circuitry 215, generate a shareable resource based at least in part on a resource sharing interface request. In an embodiment and as defined above, the shareable resource may be a data structure (e.g., an object and/or the like) that is shareable with one or more client devices. For example, upon receiving the resource sharing interface request, the group-based communication apparatus 205 may access the metadata of the resource sharing interface request to determine the sending user identifier and particular group-based communication resource identifier, such as a group-based communication channel identifier. In the example of a channel sharing interface request, based on the group-based communication channel identifier, the group-based communication apparatus 205 may access a group-based communication repository 206 to retrieve further information about the group-based communication channel associated with the group-based communication channel identifier. For example, data associated with one or more policies, permissions, privacy settings, and/or treaty data may be stored in the group-based communication repository 206 in associated with the group-based communication channel identifier. The group-based communication apparatus 205 may access the group-based communication repository 206 to retrieve a respective organization identifier associated with the sending user identifier of the channel sharing interface request. Likewise, based on the particular group-based communication resource identifier of the resource sharing interface request, the group-based communication apparatus 205 may access a group-based communication repository 206 to retrieve further information about the particular group-based communication resource associated with the group-based communication resource identifier.

After retrieving data from the group-based communication repository 206, the group-based communication apparatus 205 may generate the shareable resource. For example, the shareable resource may comprise metadata comprising data associated with the resource sharing interface request, such as the sending user identifier and a respective organization identifier, the group-based communication channel identifier, and, in the example of a channel sharing interface request, data associated with one or more policies and/or treaty data of the group-based communication channel associated with the group-based communication channel identifier. In some embodiments, the shareable resource may further comprise a uniform resource locator (URL) of a web page associated with the group-based communication platform. In this regard, the group-based communication apparatus 205 may be configured to generate a URL based on the sending user identifier and the group-based communication resource identifier associated with the resource sharing interface request. In other words, the URL may be unique to the user associated with the sending user identifier. In some embodiments, the group-based communication apparatus 205 may be configured to temporarily store the shareable resource in memory 204. In an embodiment, the shareable resource may further comprise the confirmation code stored in the group-based communication repository.

In an embodiment, after the group-based communication apparatus 205 has generated the shareable resource, the group-based communication apparatus 205 may cause rendering of data associated with the shareable resource to a group-based communication interface associated with the sending user identifier of the resource sharing interface request. In this regard, the group-based communication apparatus may access the row of table data associated with the group-based communication channel identifier in the group-based communication repository. For example, the data associated with the shareable resource may be rendered within a user interface element, such as a dialog box, as shown in FIG. 4C. In the illustrated embodiment, the dialog box comprises hyperlink text associated with the URL of the shareable resource. As described above, the URL may be unique to the sending user. In this regard, the sending user may provide the URL to one or more users associated with different organization identifiers (e.g., users outside of the sending user's organization). For example, as illustrated in FIG. 4C, a user may select the URL in order to copy the URL text to provide to one or more receiving users. In an embodiment, the group-based communication apparatus 205 may render an indication that the URL text has been copied to the group-based communication interface of the sending user. In another embodiment, the group-based communication apparatus may cause rendering of data associated with the shareable resource to one or more group-based communication interfaces associated with a respective receiving user identifier. For example, the group-based communication apparatus 205 may render the URL text (e.g., in the form of a selectable hyperlink) associated with the shareable resource directly to group-based communication interface associated with the receiving user identifier of the receiving user (e.g., a user that the sending user has identified to share a group-based communication resource with) via a messaging communication, dialog box, email, and/or the like.

Regardless of how the client device associated with the at least one receiving user identifier receives the URL associated with the shareable resource, the group-based communication apparatus 205 may be configured to receive, from a client device 108 associated with the at least one receiving user identifier and a second organization identifier (e.g., an organization identifier different from the organization identifier of the sending user) and via the network 112, a shareable resource access request comprising data indicating that the web page associated with the URL has been accessed by the user associated with the at least one receiving user identifier. For example, the shareable resource access request may comprise the receiving user identifier and the confirmation code associated with the URL. In some embodiments, in response to receiving the shareable resource access request, the group-based communication apparatus 205 may retrieve the confirmation code associated with the URL from the group-based communication repository and compare the retrieved confirmation code to the confirmation code associated with the shareable resource access request.

If the retrieved confirmation code fails to match the confirmation code associated with the shareable resource access request, the group-based communication apparatus 205 may be configured to deny the shareable resource access request and cause rendering of an indication of the denial to the group-based communication interface of the client device who initiated the shareable resource access request.

In response to receiving the access request and, in some embodiments, in response to the affirmation that the confirmation codes match, the group-based communication apparatus may cause rendering of data associated with the shareable resource to the group-based communication interface associated with the at least one receiving user identifier. In this regard, the data associated with the shareable resource may be rendered via one or more graphical user interface elements, such as the dialog boxes illustrated in FIG. 5A-C. In other embodiments, the data associated with the shareable resource may be rendered to a web page (e.g., the web page associated with the URL) and accessed by the client device associated with the at least one receiving user identifier via a web browser.

Figure 5A:
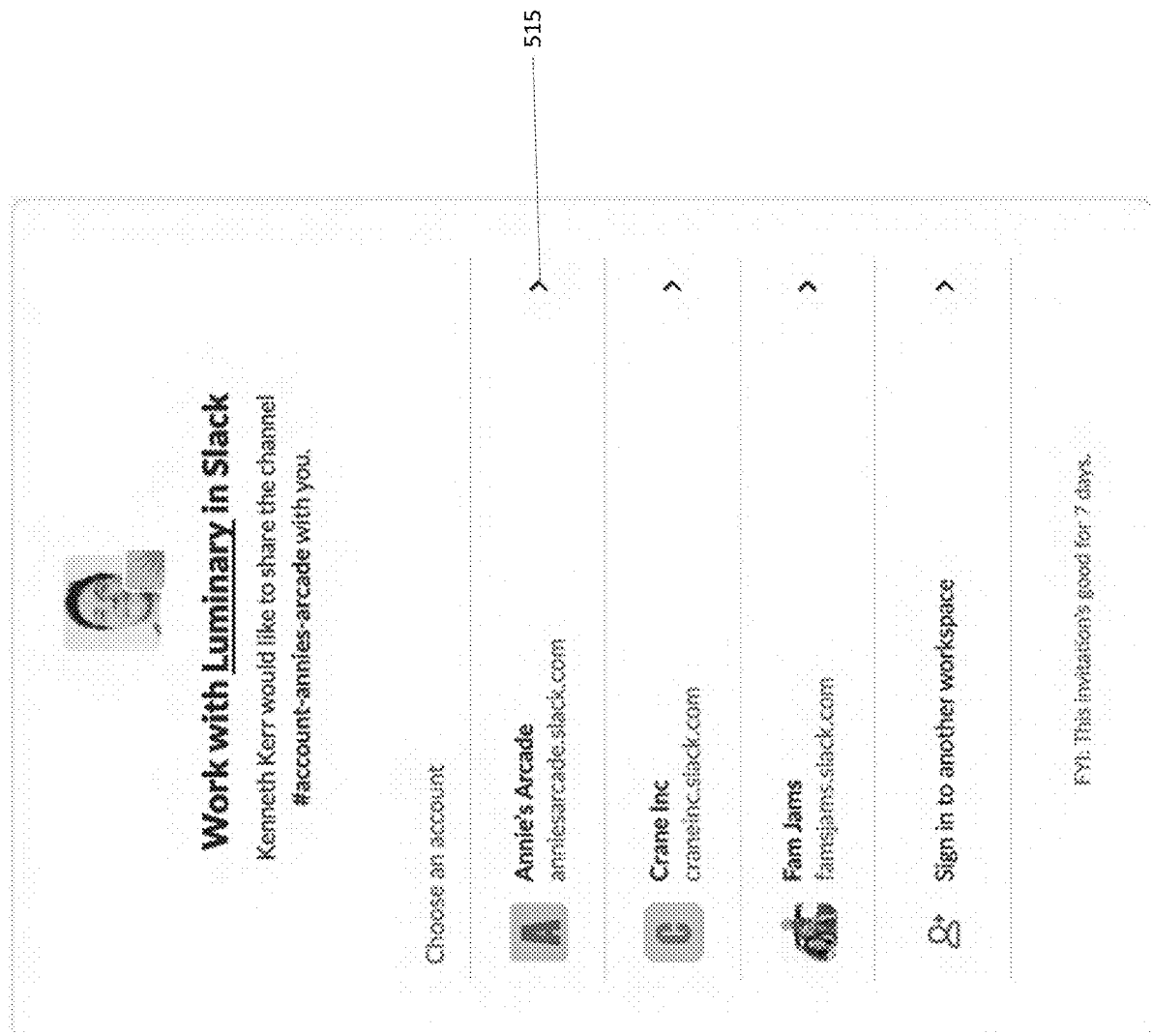
FIG. 5A shows an example graphical user interface element associated with rendering of data associated with the shareable resource to a group-based communication interface configured in accordance with one embodiment.

FIG. 5A illustrates an example graphical user interface element rendered to a group-based communication interface of a receiving user associated with a receiving user identifier of the shareable resource. For example, upon receiving the shareable resource access request from the client device 108 associated with the receiving user identifier, the group-based communication apparatus 205 may be configured to render data associated with the shareable resource to the group-based communication interface associated with the receiving user identifier. As shown in FIG. 5A, a dialog box is rendered to a group-based communication interface associated with the receiving user identifier comprising data associated with the sending user identifier (e.g., "Kenneth Kerr"), an organizationidentifier associated with the sending user identifier (e.g., "Luminary"), and data associated with the group-based communication channel identifier to be shared ("#account-annies-arcades") apparatus 205. While FIGS. 5A-C illustrate example resource sharing with regards to a shared group-based communication channel, similar processes and dialog boxes may be presented in instances in which a different resource is being shared, such as a group-based communication workspace, direct messages, multi-person direct messages, and/or the like.

In the example dialog box illustrated in FIG. 5A, the receiving user may select a group-based communication workspace associated with the receiving user identifier for the group-based communication channel identifier to be associated with. In this regard, the group-based communication apparatus 205 may retrieve, from group-based communication repository 206, data associated with one or more group-based communication workspaces associated with the receiving user identifier and cause rendering of data associated with the one or more group-based communication workspaces to a group-based communication interface associated with the receiving user identifier. In the illustrated embodiment of FIG. 5A, the dialog box comprises a listing of group-based communication workspaces associated with the receiving user identifier. In some embodiments, as shown in FIG. 5A, the dialog box may further comprise options for the receiving user to sign in to a group-based communication workspace not displayed in the listing and/or create a new group-based communication workspace for the group-based communication channel identifier to be associated with. In an embodiment, the dialog box of FIG. 5A may further comprise a graphical user interface element (arrow buttons 515) associated with each group-based communication workspace listed for, upon user selection (e.g., touch, mouse-click), triggering the group-based communication apparatus 205 to render a second dialog box such as the dialog box exemplified by FIG. 5B.

Figure 5B:
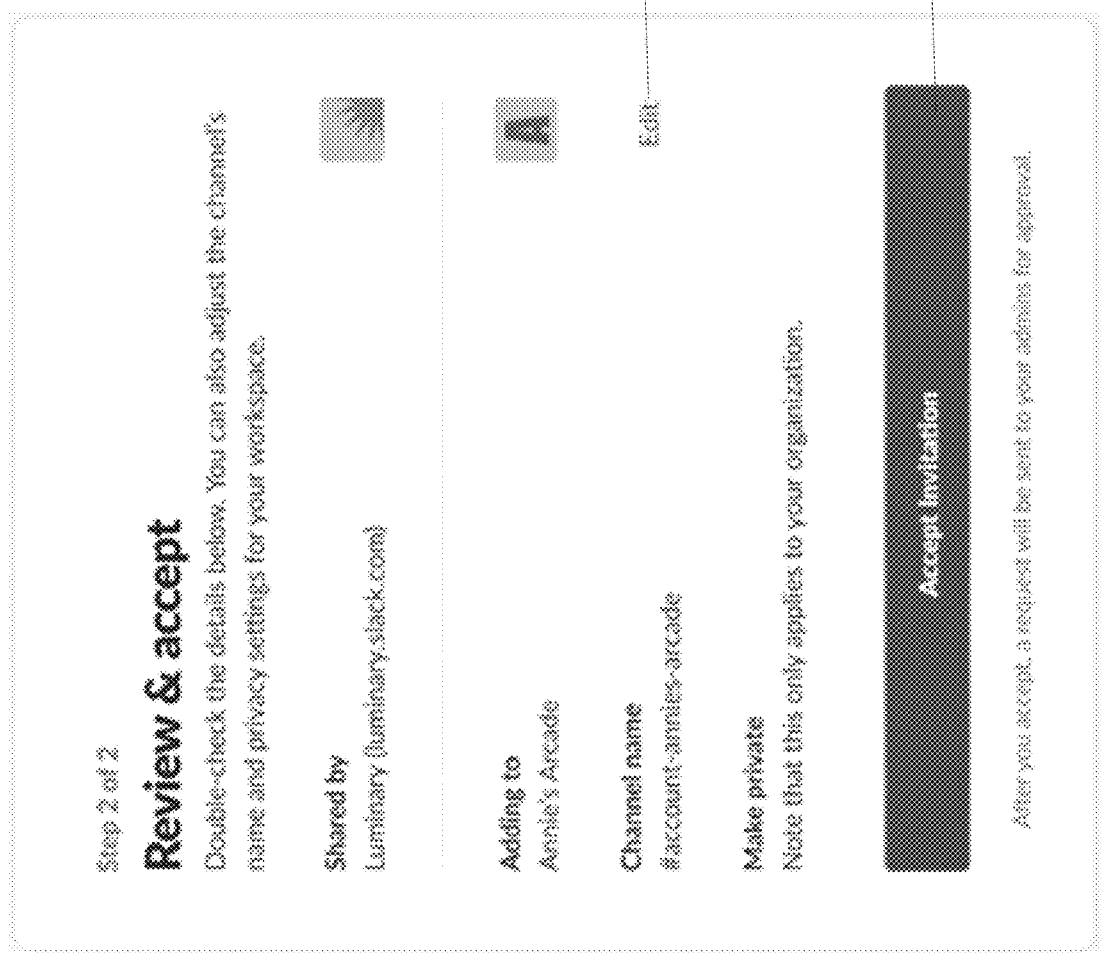
FIG. 5B shows an example graphical user interface element associated with rendering of data associated with the shareable resource to a group-based communication interface configured in accordance with one embodiment.
Figure 5C:
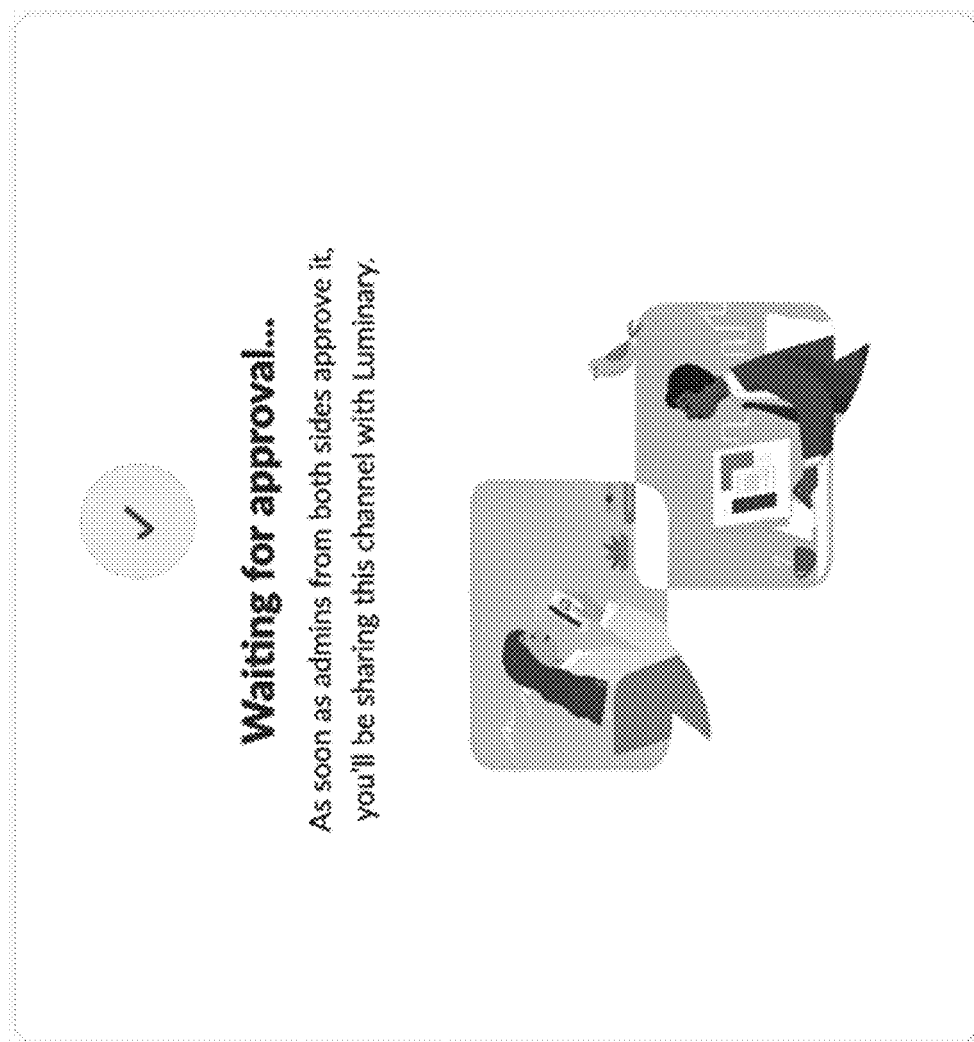
FIG. 5C shows an example graphical user interface element associated with rendering of data associated with the shareable resource to a group-based communication interface configured in accordance with one embodiment.

In the example dialog box illustrated in FIG. 5B, the receiving user may review data associated with the shareable resource and the group-based communication channel to which the receiving user will be added prior to accepting the invitation. In this regard, the group-based communication apparatus 205 may cause rendering of data associated with the shareable resource to a group-based communication interface associated with the at least one receiving user identifier. In the illustrated embodiment of FIG. 5B, the dialog box comprises data associated with the organization identifier associated with the sending user identifier (e.g., "Luminary"), the group-based communication workspace that the group-based communication channel identifier will be associated with (e.g., Annie's Arcade), and data associated with the group-based communication channel identifier (e.g., "#account-annies-arcade"). In one embodiment, the dialog box may further comprise an option for the at least one receiving user to edit the group-defined title of the group-based communication channel. In this regard, the at least one receiving user may assign the group-based communication channel a group-defined title different from the group-defined title originally assigned. For example, the at least one receiving user may rename the group-defined title of the group-based communication channel "#channel-with-luminary" while the sending user may still view the group-defined title of the group-based communication channel as "account-annies-arcade."

Figure 5D:
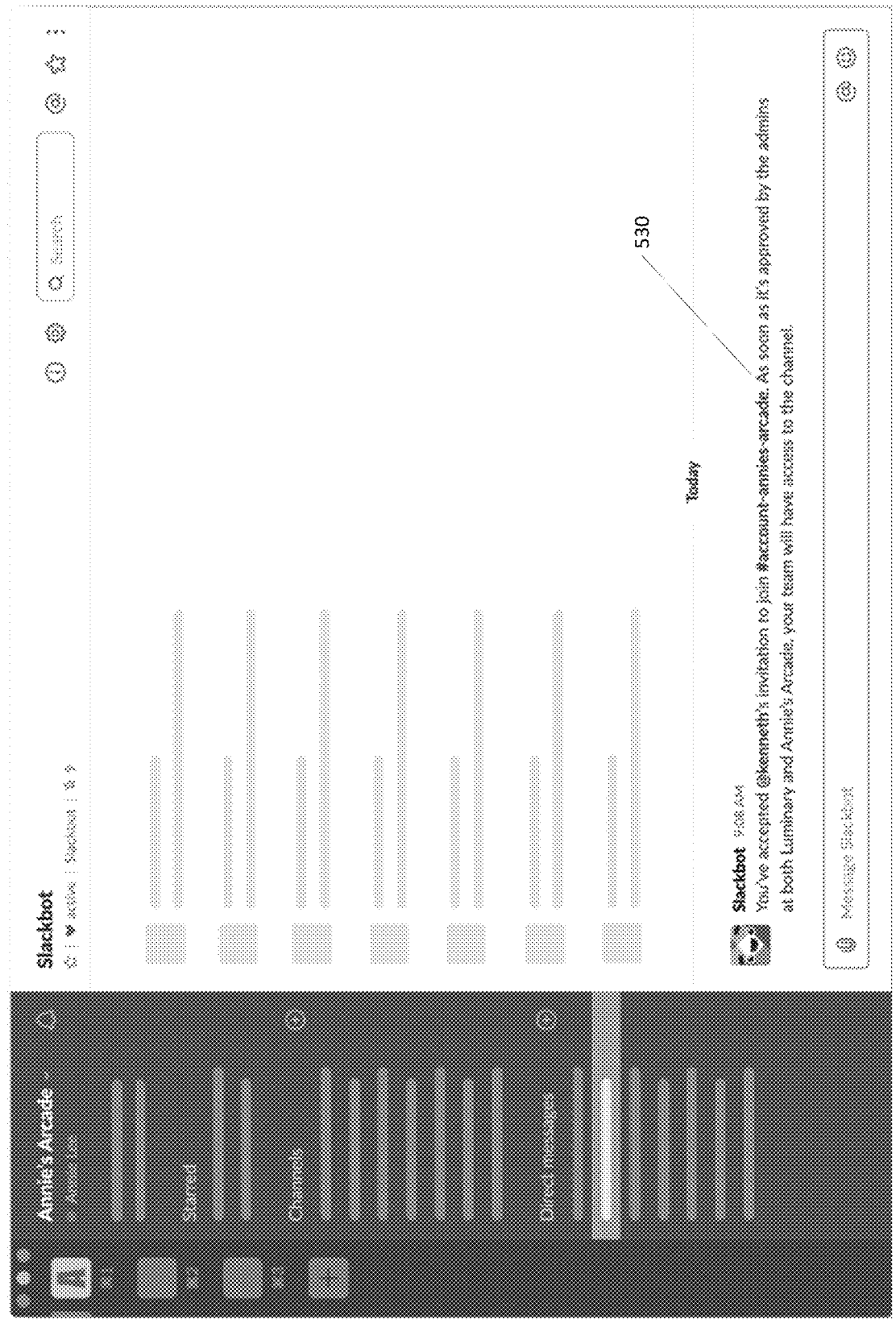
FIG. 5D shows an example messaging communication associated with rendering of data associated with the shareable resource to a group-based communication interface configured in accordance with one embodiment.

It will be appreciated that additional data may be rendered to the dialog box, such as data associated with policies associated with the group-based communication channel identifier, and/or the like. In an embodiment, the dialog box of FIG. 5B may further comprise a graphical user interface element, such as an accept invitation button 520 for user selection (e.g., touch, mouse-click). Upon user selection of the accept invitation button 520, the client device 108 may transmit a confirmation indication to the group-based communication apparatus 205. In this regard, at Block 330, the group-based communication apparatus 205 is configured to receive, from a client device associated with a receiving user identifier and via communications circuitry 208, a confirmation indication associated with the shareable resource. The confirmation indication may comprise data associated with the shareable resource, such as the sending user identifier, a group-based communication resource identifier (e.g., a group-based communication channel identifier), a receiving user identifier associated with the client device that initiated the generation of the confirmation indication, and data associated with a group-based communication workspace to associate with the group-based communication channel identifier and/or other group-based communication resource identifier, such as the group-based communication workspace selected by the receiving user at the dialog box illustrated in FIG. 5B. In some embodiments, in response to receiving the confirmation indication, the group-based communication apparatus 205 may be configured to cause rendering of a third dialog box, such as the example dialog box illustrated in FIG. 5C. The third dialog box may comprise an indication and/or message to the receiving user that the confirmation indication was received by the group-based communication apparatus 205 and that the resource may be shared upon user admin approval. Additionally, or alternatively, data associated with the third dialog box may be rendered by the group-based communication apparatus 205 to a group-based communication interface of the one or more receiving users in the form of a messaging communication 530 as depicted in FIG. 5D.

In an embodiment, in response to receiving a confirmation indication, the group-based communication apparatus 205 may update table data in a group-based communication repository. For example, as illustrated in FIG. 8B, the group-based communication apparatus may generate a row of table data associated with the received confirmation indication in a 'shared_channel_approvals' table in the group-based communication repository 206. In this regard, for each confirmation indication associated with a particular shared resource candidate request received from a respective admin device, the group-based communication apparatus 205 may generate a row of table data associated with the respective confirmation indication.

At Block 340, the group-based communication apparatus 205 may generate a shared resource candidate request. In this regard, in response to receiving the resource sharing interface request from the first client device associated with the sending user identifier and the confirmation indication from the second client device associated with the receiving user identifier, the group-based communication apparatus 205205 may be configured to generate, via shared channel circuitry 215, a shared resource candidate request.

Figure 6B:
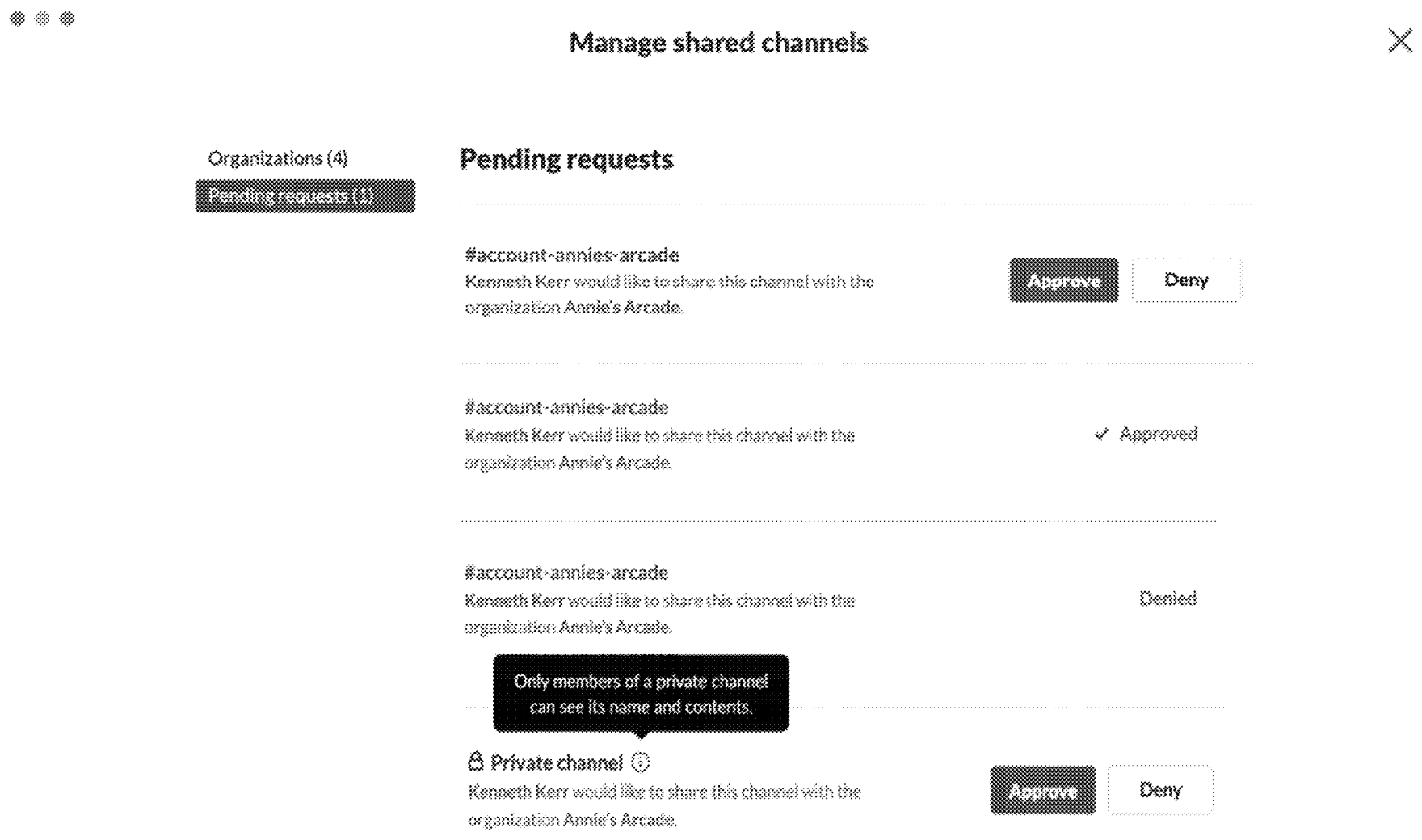

In some embodiments, the shared resource candidate request may comprise rendering of an authorization interface to a group-based communication interface of one or more admin client devices. In this regard, at Block 350, the group-based communication apparatus, via shared channel circuitry 215, group-based communication circuitry 210, communications circuitry 208, and/or the like, may transmit an authorization interface associated with the shared resource candidate request to an admin client device associated with an admin user identifier associated with the group-based communication resource identifier. For example, the group-based communication apparatus 205 may transmit an authorization interface associated with a shared channel candidate request to an admin client device associated with an admin user identifier associated with a group-based communication channel identifier. An example authorization interface 600 is illustrated in FIG. 6. In some embodiments, the authorization interface may be caused to be rendered in the form of a dialog box, menu, and/or the like. As shown in FIG. 6, the example authorization interface is rendered to in the form of a messaging communication within a messaging pane of a group-based communication interface of an admin client device associated with an admin user identifier associated with the group-based channel identifier. Additionally, or alternatively, as illustrated in FIG. 6B, data associated with the authorization interface may be caused to be rendered in the form of a separate interface, such as a modal, in which a listing of pending shared group-based communication channel approvals associated with the admin user identifier are displayed.

The authorization interface 600 comprises data for an admin user to review and decide whether to approve or decline the shared resource candidate request. For example, the authorization interface may comprise data associated with a sending user who initiated the resource sharing interface request (e.g., the sending user identifier), data associated with a receiving user who provided the confirmation indication (e.g., one or more receiving user identifiers), and/or details about the shared group-based communication resource. For example, in an instance in which the shared resource candidate request comprises a shared channel candidate request, the authorization interface 600 may comprise details about the shared group-based communication channel, such as data associated with the group-based communication channel identifier (e.g., name of the channel, the organization associated with the channel, and/or the like). In some embodiments, data associated with one or more policies of the group-based communication channel, such as permissions, privacy settings, and/or the like may be included and rendered within the authorization interface 600.

In some embodiments, the shared resource candidate request and associated rendering of the authorization interface may be transmitted to more than one admin device. For example, in an instance in which the shared resource candidate request comprises a shared channel candidate request, in addition to transmitting the authorization interface to an admin device associated with an admin user associated with the group-based channel identifier, the group-based communication apparatus 205205 may transmit an authorization interface associated with the shared channel request to one or more admin devices associated with the organization identifiers associated with the receiving user identifiers. In this regard, admin users on all sides of the shared channel candidate request, that is, an admin user associated with the sending user identifier and one or more admin users associated with the one or more receiving user identifiers, may review a respective authorization interface and approve or decline the shared channel candidate request.

In some embodiments, the one or more admin devices may each transmit an authorization confirmation or declination of the shared resource candidate request to the group-based communication apparatus 205205 by the respective admin user selecting (e.g., by touch, mouse-click, and/or the like) a graphical user interface element associated with the authorization interface (e.g., an 'Approve' button 605, 'Decline' button 615, or the like). In this regard, at Block 360, the group-based communication apparatus 205 is configured to receive, via communications circuitry 208, an authorization confirmation associated with the shared resource candidate request from an admin client device.

In response to receiving an authorization confirmation from one or more admin client devices, the group-based communication apparatus 205 may update table data associated with the group-based communication resource in the group-based communication repository 206.

In this regard, at Block 370, the group-based communication apparatus 205 may be configured to update, via shared channel circuitry 215, a group-based communication repository 206 to at least add a sharing approval indication to table data associated with the group-based communication resource identifier. For example, in response to an authorization confirmation associated with a shared channel candidate request, the group-based communication apparatus 205 may update a group-based communication repository 206 to at least add a sharing approval indication to table data associated with the group-based communication channel identifier. In some embodiments, the sharing approval indication may be a flag on data to indicate that the group-based communication resource is a shared group-based communication resource associated with particular users associated with different organization identifiers. In one embodiment, the sharing approval indication may comprise one or more approval timestamps comprising one or more dates at which the one or more admin client devices transmitted a respective authorization confirmation associated with the shared resource candidate request to the group-based communication apparatus. In this regard, table data stored in the group-based communication repository associated with the group-based communication resource identifier may be updated to include the sharing approval indication. As illustrated in FIG. 8B, for example, a row of data associated with the group-based communication channel identifier in a table 'shared_channel_approvals' may be updated with a sharing approval indication. In the illustrated embodiment, for a row in which the 'channel_id' field comprises the group-based communication channel identifier, the 'date_approve' and 'target_date_approve' fields may be updated to comprise a respective approval timestamp (e.g., date).

Figure 6C:
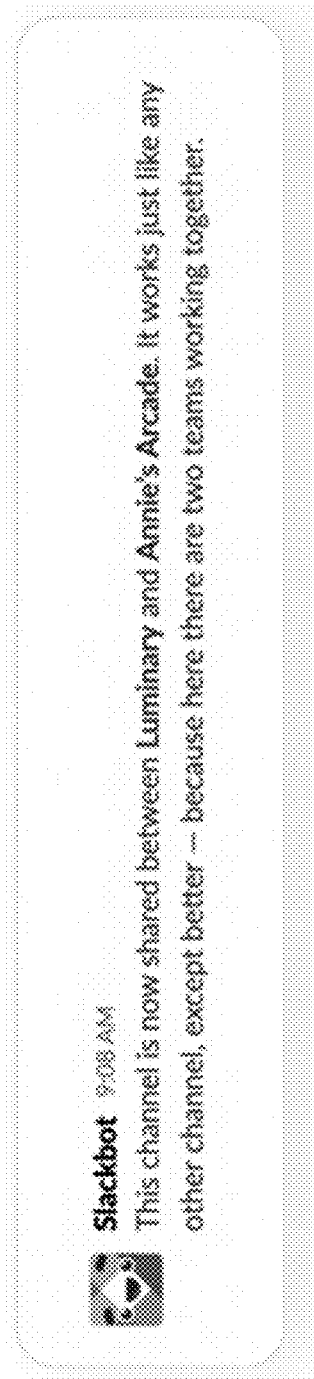
FIG. 6C shows an example messaging communication associated with rendering of data associated with a shared group-based communication resource to a group-based communication interface configured in accordance with one embodiment.

In embodiments in which table data associated with a group-based communication channel identifier in a group-based communication repository 206 comprises a sharing approval indication, the group-based communication apparatus 205 may be configured to render a group-based communication interface associated with the shared group-based communication channel to one or more respective client devices of the one or more receiving user identifiers of the channel sharing candidate request, thereby allowing the one or more receiving users associated with the one or more receiving user identifiers to interact with other members within the shared group-based communication channel. Upon admin user approval and subsequent updating of the group-based communication repository as detailed above, the group-based communication apparatus 205 may be configured to cause rendering of data associated with the shared group-based communication resource to a group-based communication interface of the sending user and/or one or more receiving users. For example, as depicted in FIG. 6C, the group-based communication apparatus 205 may transmit a messaging communication indicating that the particular group-based communication resource (e.g., group-based communication channel) is now shared between two or more organizations.

Figure 3B:
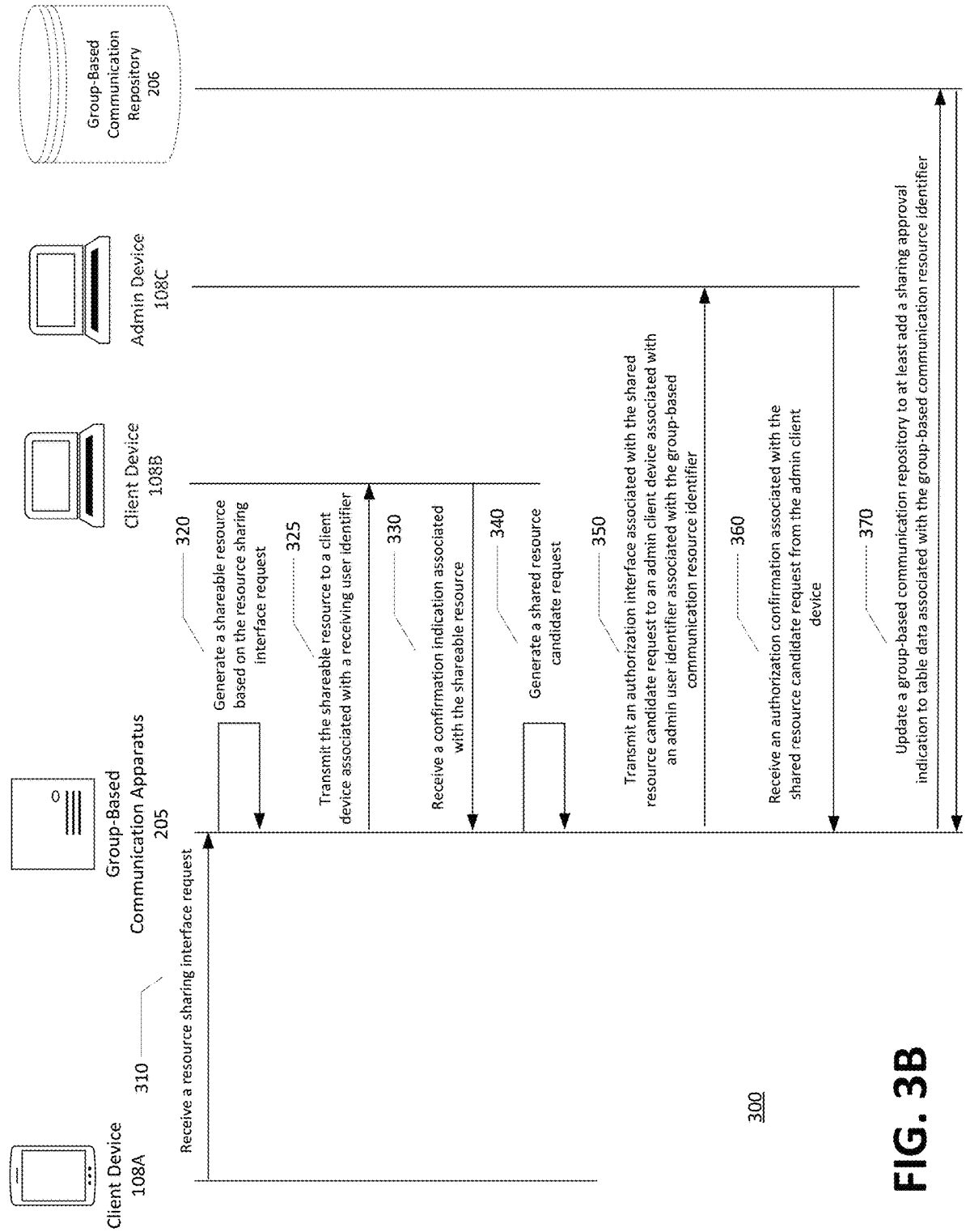
FIG. 3B is a signal diagram of an example data flow in accordance with one embodiment.

FIG. 3B is a signal diagram of an example data flow represented by method 300. Method 300 is described as being performed by at least two client devices 108A and 108B, a group-based communication apparatus 205, and at least one admin client device 108C. These devices may be similar to those previously discussed with regards to FIG. 1.

Figure 7A:
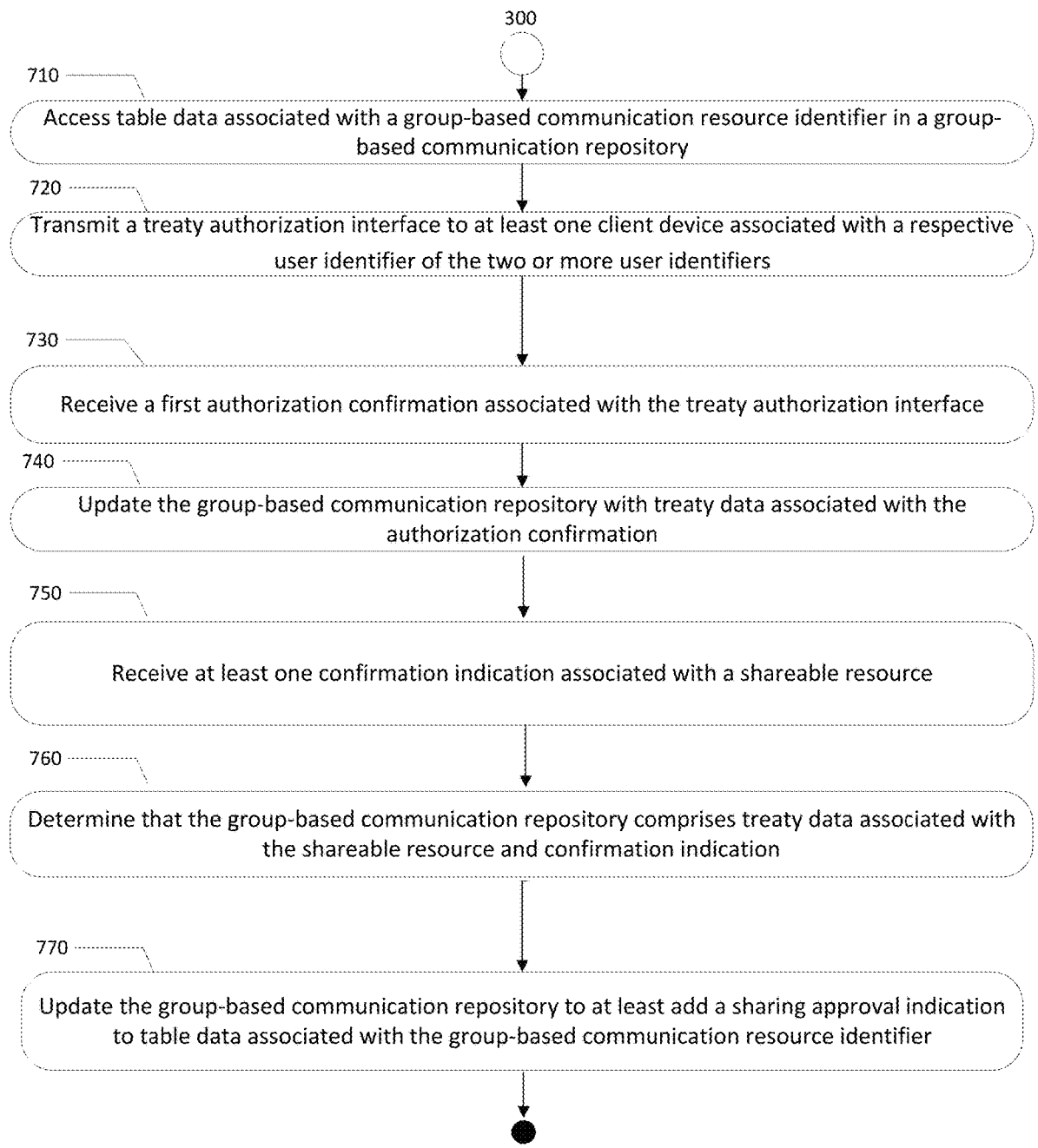
FIG. 7A is a flowchart illustrating example steps for authorizing generation of treaty data configured in accordance with one embodiment.

In embodiments, one or more organizations that have previously shared one or more group-based communication resources with each other may desire to avoid acquiring admin user approval for any group-based communication resources the organizations desire to share in the future. In this way, load on the network 112 and/or the group-based communication system 200 may be reduced by reducing transmissions associated with admin approval of shared group-based communication resources, such as group-based communication channels, group-based communication workspaces, and/or the like. Operations associated with generating and storing treaty data associated with two or more organizations to enable efficient sharing of group-based communication resources are detailed in FIG. 7.

At Block 710, the group-based communication apparatus 205 may be configured to access table data associated with a group-based communication resource identifier (e.g., a group-based communication channel identifier) in a group-based communication repository. In an embodiment, the table data may comprise two or more user identifiers and respective organization identifiers. The table data may also comprise a sharing approval indication associated with a group-based communication channel identifier or other group-based communication resource identifier of which the two or more user identifiers are associated with. The group-based communication apparatus 205 may then determine if the table data comprises treaty data.

For example, the group-based communication apparatus 205 may access the table data to determine if the table data comprises treaty data in response to the table data being updated with a shared approval indicator. In other words, after creation of a shared group-based communication channel (e.g., storage of a sharing approval indication) or other shared group-based communication resource, the group-based communication apparatus 205 may determine if treaty data exists between the two or more user identifiers. As another example, the group-based communication apparatus 205 may access the table data to determine if the table data comprises treaty data in response to meeting a predefined threshold of creations of shared group-based communication channels between the respective organization identifiers associated with the two or more user identifiers. In other words, for example, after the two or more organization identifiers have established a predefined number of shared group-based communication channels and/or other shared group-based communication resources, the group-based apparatus 205 may be configured to access the table data to determine if the table data comprises treaty data. In this regard, the table data may be accessed based on a predefined threshold of sharing approval indications associated with the two or more organization identifiers stored in the group-based communication repository.

In an instance in which the group-based communication apparatus 205 determines that the table data does not comprise treaty data, the group-based communication apparatus 205, at Block 720, may transmit a treaty authorization interface to at least one client device associated with a respective user identifier of the two or more user identifiers. In this regard, the treaty authorization interface may be similar to the authorization interface illustrated in FIG. 6. In some embodiments, the treaty authorization interface may be rendered at the at least one client device in the form of a dialog box, menu, messaging communication, and/or the like. The treaty authorization interface may be configured to display an option to enable the group-based communication apparatus 205 to store treaty data comprising the organization identifier associated with the two or more user identifiers. For example, the treaty authorization interface may comprise data associated with the table data, such as the organization identifiers involved in the treaty data, prior shared group-based communication resource data associated with the organization identifiers, and/or the like. In this way, the respective user or admin user associated with the first client device may confirm, via the treaty authorization interface, that the users and/or organizations associated with the user identifiers and/or organization identifiers of the treaty data do not need admin user approval upon future generation of any shared group-based communication resources. In this regard, future generation of shared group-based communication resources associated with the user identifiers and/or organization identifiers of the treaty data will not require generation of a shared channel candidate request or any authorization confirmations from admin client devices.

In some embodiments, the user (e.g., admin user) may transmit an authorization confirmation or declination associated with the treaty authorization interface to the group-based communication apparatus 205 by selecting (e.g., by touch, mouse-click, and/or the like) a graphical user interface element associated with the authorization interface (e.g., an 'Approve' button 605, 'Decline' button 615, or the like). In this regard, at Block 730, the group-based communication apparatus 205 is configured to receive, from a first client device 108 and via communications circuitry 208, a first authorization confirmation associated with the treaty authorization interface.

In embodiments, the group-based communication apparatus 205, at Block 720, may transmit a treaty authorization interface to one or more additional client devices associated with the user identifiers, similar to the rendering of the treaty authorization interface to the first client device associated with the first user identifier as described above. For example, the group-based communication apparatus 205 may require an authorization confirmation from a client device associated with each user identifier of the two or more user identifiers associated with the treaty data prior to storing the treaty data in a group-based communication repository 206. In this regard, the group-based communication apparatus 205 may be configured to receive, from a second client device associated with a second user identifier, a second authorization confirmation associated with the treaty authorization interface.

In response to receiving the two or more authorization confirmations, at Block 740, the group-based communication apparatus 205 may be configured to update, via shared channel circuitry 215, the group-based communication repository 206 to include treaty data associated with the authorization confirmation.

At Block 750, the group-based communication apparatus 205 may receive, from at least one client device, at least one confirmation indication associated with a shareable resource, similar to the confirmation indication described with respect to FIG. 5B. Upon receiving the at least one confirmation indication, at Block 760, the group-based communication apparatus 205 may access the group-based communication repository 206 to determine if the group-based communication repository 206 comprises treaty data associated with the sending user identifier of the shareable resource and the at least one receiving user identifier of the at least one confirmation indication.

In an instance in which the group-based communication apparatus 205 determines that the group-based communication repository 206 comprises treaty data associated with the sending user identifier and the one or more receiving user identifiers, at Block 770, the group-based communication apparatus 205 may be configured to update the group-based communication repository to at least add a sharing approval indication to table data associated with the group-based communication resource identifier of the resource sharing interface request. For example, in response to a determination that the group-based communication repository 206 comprises treaty data associated with the sending user identifier and the one or more receiving user identifiers, the group-based communication apparatus 205 may continue carrying out operations of FIG. 3A, including updating the group-based communication repository to at least add a sharing approval indication to table data associated with the group-based communication resource identifier. In this regard, the group-based apparatus 205 need not generate a shared channel candidate request and receive authorization confirmations from one or more admin devices as detailed above with regards to Blocks 340-360 of FIG. 3A. In other words, once treaty data is established in the group-based communication repository 206, a shared group-based communication channel or other shared group-based communication resource may be created once a confirmation indication is received by the group-based communication apparatus from a client device of the at least one receiving user identifier.

Figure 7B:
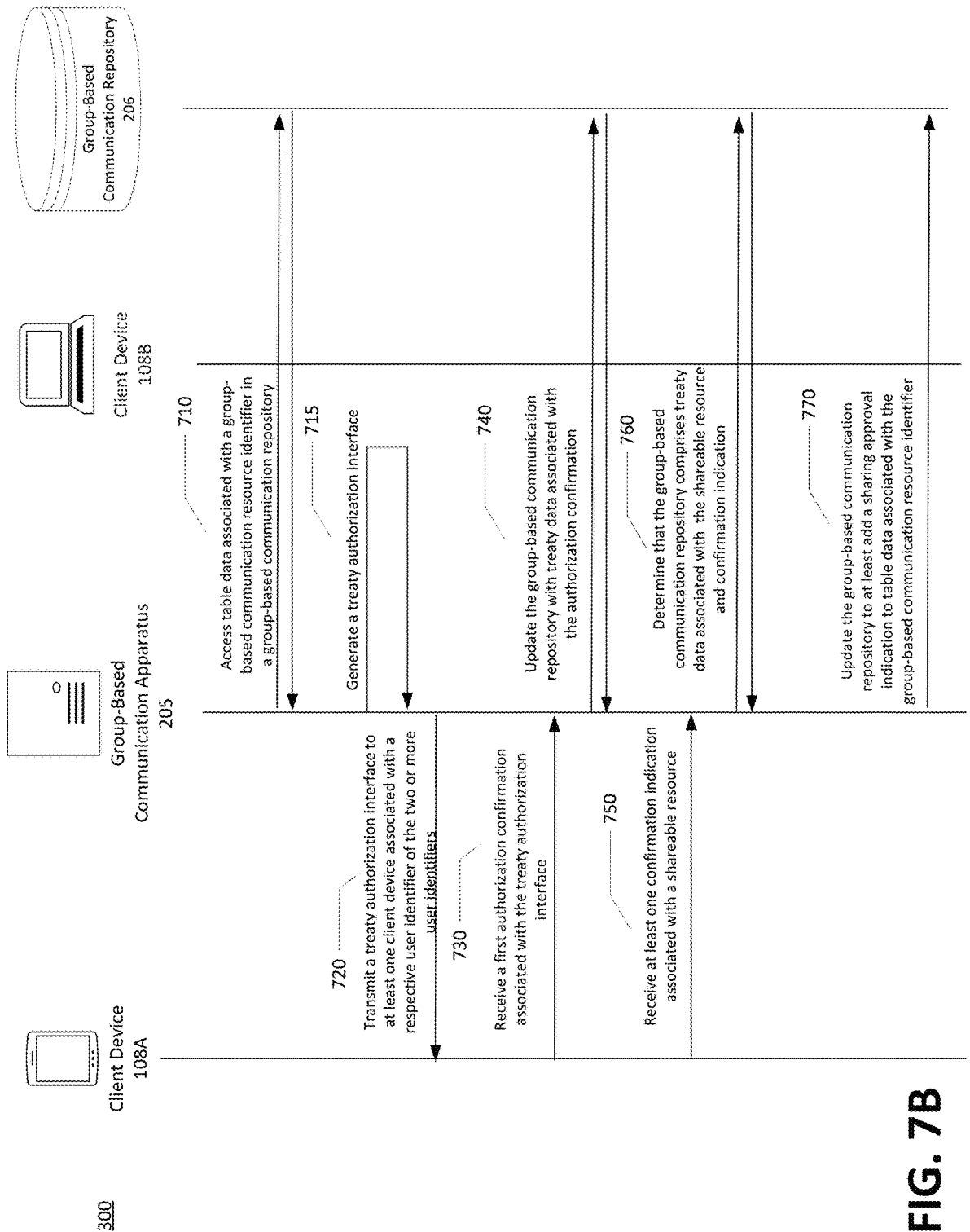
FIG. 7B is a signal diagram of an example data flow in accordance with one embodiment.

FIG. 7B is a signal diagram of an example data flow represented by method 700. Method 700 is described as being performed by at least two client devices 108A and 108B, a group-based communication apparatus 205, and a group-based communication repository 206. These may be similar to those previously discussed with regards to FIG. 1.

Figure 9A:
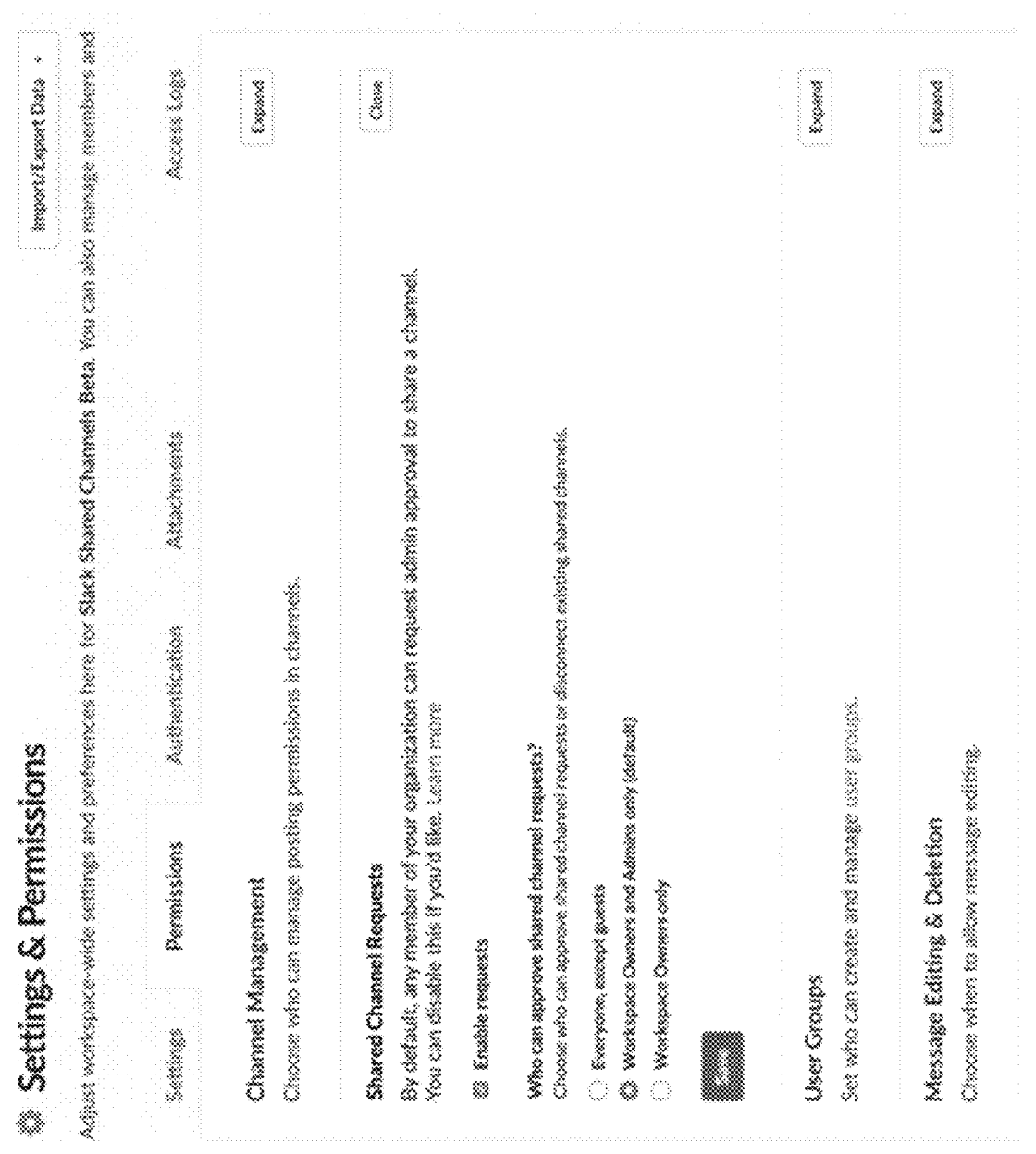
Figure 9B:
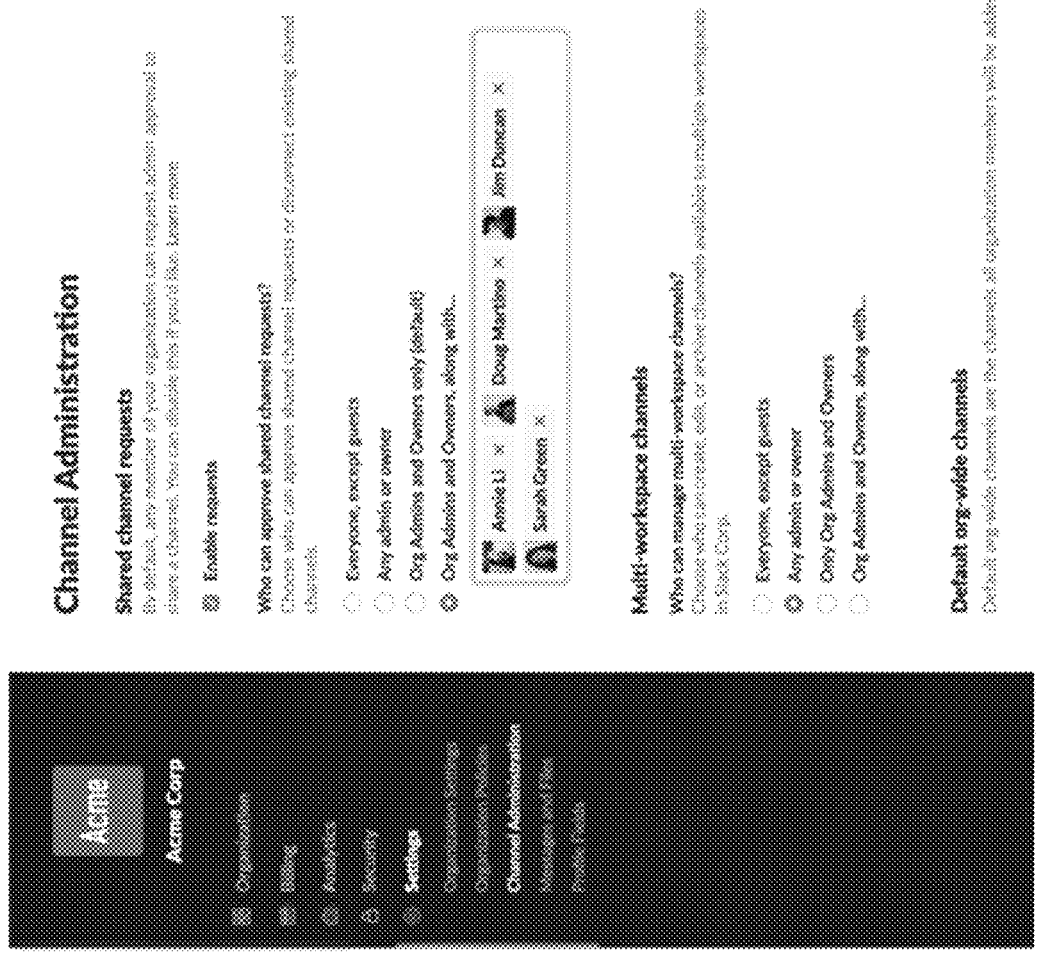
FIG. 9B shows an example rendering of an authorization interface associated with the shared channel candidate request to an admin client device configured in accordance with one embodiment.
Figure 9C:
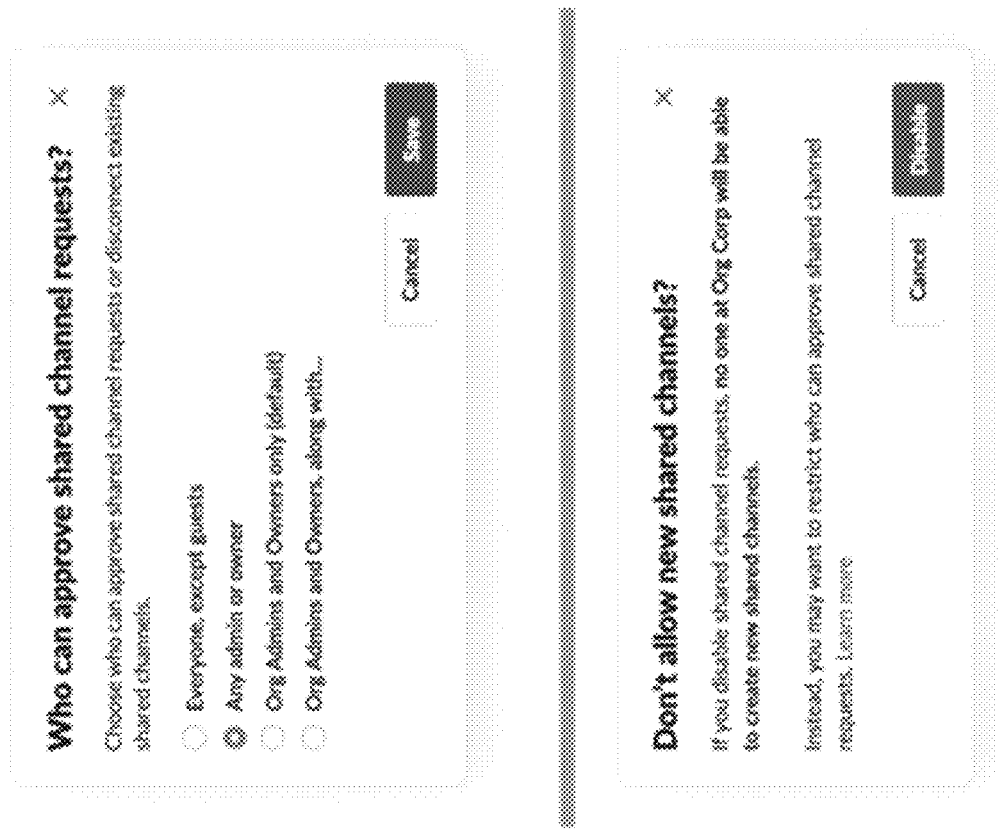
FIG. 9C shows an example rendering of an authorization interface to an admin client device configured in accordance with one embodiment.

FIG. 9A-C illustrate exemplary settings and permissions associated with an admin user of one or more group-based communication channels and/or group-based communication workspaces. In the depicted embodiments, admin users may have the option to disable requests for sharing group-based communication resources within a particular group-based communication channel or group-based communication workspace. Additionally, admin users may have the option to allow any user to approve shared channel requests. For example, in one embodiment, admin approval of shared group-based communication resources may be disabled, allowing non-admin users to approve the requests.

In another embodiment, such as the one depicted in FIG. 9B, approval of shared group-based communication resources may be allowed only by admin users and particular non-admin users. In the depicted embodiment, in addition to admin users, several non-admin users (e.g., "Annie Li", "Doug Martino", "Jim Duncan", and "Sarah Green") have been given permission to approve shared resource requests. FIG. 9C illustrates an alternative embodiment in which the options are presented via one or more dialog boxes.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. An apparatus comprising at least one processor and at least one non-transitory memory including program code, the at least one non-transitory memory and the program code configured to, with the processor, cause the apparatus to:
   access table data associated with a group-based communication resource identifier in a group-based communication repository, wherein the table data comprises a first user identifier associated with a first organization identifier and a second user identifier associated with a second organization identifier;
   transmit a treaty authorization interface to a first client device associated with the first user identifier;
   receive, from the first client device, a first authorization confirmation associated with the treaty authorization interface;
   receive a second authorization confirmation from a second client device associated with the second user identifier; and
   in response to receiving the first authorization confirmation and the second authorization confirmation, update the group-based communication repository with treaty data associated with the first organization identifier and the second organization identifier.

2. The apparatus of claim 1, wherein the at least one non-transitory memory and the program code are further configured to, with the processor, cause the apparatus to:
   receive, from a third client device associated with a third user identifier, a confirmation indication associated with a shareable resource associated with a second group-based communication resource identifier;
   retrieve, from the group-based communication repository, the treaty data associated with the first organization identifier and the second organization identifier; and
   based at least in part on the treaty data, update the group-based communication repository to at least add to the table data a sharing approval indication associated with the shareable resource.

3. The apparatus of claim 1, wherein the at least one non-transitory memory and the program code are further configured to, with the processor, cause the apparatus to:
   cause rendering of the treaty authorization interface to the first client device,
   wherein the treaty authorization interface comprises a graphical user interface element configured to enable user selection of an action associated with the treaty data.

4. The apparatus of claim 1, wherein updating the group-based communication repository with the treaty data comprises sending the treaty data to the group-based communication repository.

5. The apparatus of claim 1, wherein the at least one non-transitory memory and the program code are further configured to, with the processor, cause the apparatus to:
   generate the treaty data based at least in part on receiving the first authorization confirmation and the second authorization confirmation.

6. The apparatus of claim 1, wherein the treaty data comprise the first organization identifier and the second organization identifier.

7. The apparatus of claim 1, wherein the table data is accessed based on a predefined threshold of sharing approval indications associated with the first organization identifier and the second organization identifier.

8. A computer-implemented method comprising:
   accessing table data associated with a group-based communication resource identifier in a group-based communication repository, wherein the table data comprises a first user identifier associated with a first organization identifier and a second user identifier associated with a second organization identifier;
   transmitting a treaty authorization interface to a first client device associated with the first user identifier;
   receiving, from the first client device, a first authorization confirmation associated with the treaty authorization interface;
   receiving a second authorization confirmation from a second client device associated with the second user identifier; and
   in response to receiving the first authorization confirmation and the second authorization confirmation, updating the group-based communication repository with treaty data associated with the first organization identifier and the second organization identifier.

9. The computer-implemented method of claim 8, further comprising:
   receiving, from a third client device associated with a third user identifier, a confirmation indication associated with a shareable resource associated with a second group-based communication resource identifier;
   retrieving, from the group-based communication repository, the treaty data associated with the first organization identifier and the second organization identifier; and
   based at least in part on the treaty data, updating the group-based communication repository to at least add to the table data a sharing approval indication associated with the shareable resource.

10. The computer-implemented method of claim 8, further comprising:
    causing rendering of the treaty authorization interface to the first client device, wherein the treaty authorization interface comprises a graphical user interface element configured to enable user selection of an action associated with the treaty data.

11. The computer-implemented method of claim 8, wherein updating the group-based communication repository with the treaty data comprises sending the treaty data to the group-based communication repository.

12. The computer-implemented method of claim 8, further comprising:
   generating the treaty data based at least in part on receiving the first authorization confirmation.

13. The computer-implemented method of claim 8, wherein the table data is accessed based on a predefined threshold of sharing approval indications associated with the first organization identifier and the second organization identifier.

14. A computer program product comprising at least one non-transitory computer-readable storage medium having computer-readable program code portions stored therein, the computer-readable program code portions comprising an executable portion configured to:
   access table data associated with a group-based communication resource identifier in a group-based communication repository, wherein the table data comprises a first user identifier associated with a first organization identifier and a second user identifier associated with a second organization identifier;
   transmit a treaty authorization interface to a first client device associated with the first user identifier;
   receive, from the first client device, a first authorization confirmation associated with the treaty authorization interface;
   receive a second authorization confirmation from a second client device associated with the second user identifier; and
   in response to receiving the first authorization confirmation and the second authorization confirmation, update the group-based communication repository with treaty data associated with the first organization identifier and the second organization identifier.

15. The computer program product of claim 14, wherein the computer-readable program code portions comprising the executable portion are further configured to:
   receive, from a third client device associated with a third user identifier, a confirmation indication associated with a shareable resource associated with a second group-based communication resource identifier;
   retrieve, from the group-based communication repository, the treaty data associated with the first organization identifier and the second organization identifier; and
   based at least in part on the treaty data, update the group-based communication repository to at least add to the table data a sharing approval indication associated with the shareable resource.

16. The computer program product of claim 14, wherein the computer-readable program code portions comprising the executable portion are further configured to:
   generate the treaty data based at least in part on receiving the first authorization confirmation and the second authorization confirmation.

17. The computer program product of claim 16, wherein the treaty data comprise the first organization identifier and the second organization identifier.

18. The computer program product of claim 14, wherein the treaty data are associated with the first user identifier and the second user identifier, and wherein the computer-readable program code portions comprising the executable portion are further configured to:
   in a subsequent instance, determine that the group-based communication repository comprises the treaty data associated with the first user identifier and the second user identifier.

19. The computer program product of claim 18, wherein the table data is accessed in response to receiving a confirmation indication associated with at least one of the first user identifier and the second user identifier.

20. The computer program product of claim 18, wherein the computer-readable program code portions comprising the executable portion are further configured to:
   in response to determining that the group-based communication repository comprises the treaty data, update the table data associated with the group-based communication resource identifier to include a sharing approval indication.

* * * * *